US011981577B2

United States Patent
Hodgkins et al.

(10) Patent No.: US 11,981,577 B2
(45) Date of Patent: May 14, 2024

(54) MODIFIED ZEOLITES THAT INCLUDE ZIRCONIUM-CONTAINING ORGANOMETALLIC MOIETIES AND METHODS FOR MAKING SUCH

(71) Applicants: Saudi Arabian Oil Company, Dhahran (SA); King Abdullah University of Science and Technology, Thuwal (SA)

(72) Inventors: Robert Peter Hodgkins, Dhahran (SA); Omer Refa Koseoglu, Dhahran (SA); Jean-Marie Maurice Basset, Thuwal (SA); Kuo-Wei Huang, Thuwal (SA); Anissa Bendjeriou Sedjerari, Thuwal (SA); Manoj K. Gangwar, Thuwal (SA); Sathiyamoorthy Murugesan, Thuwal (SA)

(73) Assignees: Saudi Arabian Oil Company, Dhahran (SA); King Abdullah University of Science and Technology, Thuwal (SA)

(*) Notice: Subject to any disclaimer, the term of this patent is extended or adjusted under 35 U.S.C. 154(b) by 286 days.

(21) Appl. No.: 17/230,505

(22) Filed: Apr. 14, 2021

(65) Prior Publication Data

US 2022/0340431 A1    Oct. 27, 2022

(51) Int. Cl.
*B01J 29/04* (2006.01)
*B01J 29/40* (2006.01)
(Continued)

(52) U.S. Cl.
CPC .......... *C01B 39/026* (2013.01); *B01J 29/405* (2013.01); *C01B 39/40* (2013.01);
(Continued)

(58) Field of Classification Search
CPC ........ B01J 29/041; B01J 29/06; B01J 29/061; B01J 29/405; C01P 2006/16; C01P 2006/62; C01P 2006/64
See application file for complete search history.

(56) References Cited

U.S. PATENT DOCUMENTS

| 5,523,506 A | 6/1996 | Benazzi et al. |
| 7,994,085 B2 | 8/2011 | Chaumonnot et al. |

(Continued)

FOREIGN PATENT DOCUMENTS

| WO | 199009845 A1 | 9/1990 |
| WO | 2019035045 A1 | 2/2019 |

OTHER PUBLICATIONS

Alladin et al., "Thermolysis of silica-supported bis(neopentyl) complexes of titanium and zirconium", Inorganica Chimica Acta, vol. 345, pp. 292-298, 2003.

(Continued)

*Primary Examiner* — Hoa (Holly) Le
(74) *Attorney, Agent, or Firm* — DINSMORE & SHOHL LLP

(57) ABSTRACT

Disclosed herein are modified zeolites and methods for making modified zeolites. In one or more embodiments disclosed herein, a zeolite may include a microporous framework comprising a plurality of micropores having diameters of less than or equal to 2 nm. The microporous framework may include at least silicon atoms and oxygen atoms. The modified zeolite may further include organometallic moieties each bonded to bridging oxygen atoms. The organometallic moieties may include a zirconium atom. The zirconium atom may be bonded to a bridging oxygen atom, and the bridging oxygen atom may bridge the zirconium atom of the organometallic moiety and a silicon atom of the microporous framework.

20 Claims, 10 Drawing Sheets

(51) Int. Cl.
    C01B 39/02    (2006.01)
    C01B 39/40    (2006.01)
(52) U.S. Cl.
    CPC ...... B01J 2229/186 (2013.01); B01J 2229/34
        (2013.01); C01P 2002/82 (2013.01); C01P
        2002/86 (2013.01); C01P 2004/62 (2013.01);
              C01P 2004/64 (2013.01); C01P 2006/16
                                                 (2013.01)

(56)                    References Cited

U.S. PATENT DOCUMENTS 10,196,465  B2      2/2019  Han et al.
    10,427,142  B1 *   10/2019  Al-Herz ................. C10G 11/18
    11,565,942  B2 *    1/2023  Hodgkins ............ B01J 37/0203
    2018/0327523  A1 * 11/2018  Han ........................ C08F 8/40
    2019/0040159  A1    2/2019  Han et al.
    2020/0171475  A1 *  6/2020  Basset ..................... B01J 29/42
    2022/0340435  A1 * 10/2022  Hodgkins ............ B01J 37/0018
    2022/0348474  A1 * 11/2022  Hodgkins ............... C01B 39/40

OTHER PUBLICATIONS

Alaris, "Titanium Neopentyl supported onto KCC-1 and A1-modified KCC-1 and its Catalytic Application for Ethylene polymerization", Thesis, Aug. 2018.
Astala et al., "The Properties of Methylene- and Amine-Substituted Zeolites from First Principles", Journal of the Americal Chemical Society, vol. 126, pp. 1843-1848, 2004.
Bendjeriou-Sedjerari et al., "A well-defined mesoporous amine silica surface via a selective treatment of SBA-15 with ammonia", Chem. Commun., vol. 48, pp. 3067-3069, 2012.
Bendjeriou-Sedjerari et al., "Bipodal Surface Organometallic Complexes with Surface N-Donor Ligands and Application to the Catalytic Cleavage of C—H and C—C Bonds in n-Butane", Journal of the Americal Chemical Society, vol. 135, pp. 17943-17951, 2013.
Bezerra et al., "CO2 adsorption in amine-grafted zeolite 13X", Applied Surface Science, vol. 314, pp. 314-321, 2014.
Bini et al., "Surface Organometallic Chemistry of Titanium: Synthesis, Characterization, and Reactivity of ($\equiv$ Si-O)nTi (CH2C(CH3)3)4-n (n=1,2) Grafted on aerosil Silica and MCM-41", Organometallics, vol. 25, pp. 3743-376, 2006.
Bonati et al., "Synthesis, Characterization, and Catalytic Properties of Novel Single-Site and Nanosized Platinum Catalysts", Organometallics, vol. 31, pp. 5243-5251, 2012.
Chatti et al., "Amine loaded zeolites for carbon dioxide capture: Amine loading and adsorption studies", Microporous and Mesoporous Materials, vol. 121, pp. 84-89, 2009.
Coperet et al., "Surface Organometallic and Coordination Chemistry toward Single-Site Heterogeneous Catalysts: Strategies, Methods, Structures, and Activities", Chemical Reviews, vol. 116, pp. 323-421, 2016.
Delgado et al., "Characterization of Surface Hydride Hafnium Complexes on Alumina by a Combination of Experiments and DFT Calculations", The Journal of Physical Chemistry, vol. 115, pp. 6757-6763, 2011.
Feher et al., "Silasequioxanes as Ligands in Inorganic and Organometallic Chemistry", Polyhedron, vol. 14, No. 22, pp. 3239-3253, 1995.
Guzman et al., "Supported molecular catalysts: metal complexes and clusters on oxides and zeolites", The Royal Society of Chemistry, Dalton Trans., pp. 3303-3318, Jun. 16, 2003.

Holmes et al., Tetraneopentyltitanium Derived Supported Catalysts, Journal of Catalysis, vol. 176, pp. 173-181, 1998.
Jadhav et al., "Monoethanol Amine Modified Zeolite 13X for CO2 Adsorption at Different Temperatures", Energy & Fuels, vol. 21, pp. 3555-3559, 2007.
Jeantelot et al., "TiO2-supported Pt single atoms by surface organometallic chemistry for photoatalytic hydrogen evolution", Phys. Chem. Chem. Phys., vol. 21, pp. 24429-24440, 2019.
Kampers et al., "Influence of preparation method on the metal cluster size of Pt/ZSM-5 catalysts as studied with extended X-ray adsorption fine structure spectroscopy", J. Phys. Chem., vol. 94, pp. 8574-8578, 1990.
Larabi et al., "Surface Organometallic Chemistry of Titanium on Silica-Alumina and Catalytic Hydrogenolysis of Waxes at Low Temperature", Organometallics, vol. 28, pp. 5647-5655, 2009.
Legagneux et al., "Grafting Reaction of Platinum Organometallic Complexes on Silica-Supported or Unsupported Heteropolyacids", Organometallics, vol. 30, pp. 1783-1793, 2011.
Maksoud et al., "A strategy to convert propane to aromatics (BTX) using TiNp4 grafted at the periphery of ZSM-5 by surface organometallic chemistry", Royal Society of Chemistry, Dalton Transactions, vol. 48, pp. 6611-6620, 2019.
Narasimharao et al., Novel solid basic catalysts by nitridation of zeolite beta at low temperature:, Microporous and Mesoporous Materials, vol. 90, pp. 377-383, 2006.
Pasha et al., "C—H and C—C Activation of n-Butane with Zirconium Hydrides Supported on SBA15 Containing N-Donor Ligands: [($\equiv$ SINH-)($\equiv$ SiX-)ZrH2], [($\equiv$ SINH-)($\equiv$ SiX-)2ZrH], and [($\equiv$ SiN=)($\equiv$ SiX-)ZrH] (X= -Nh-, -O-). A DFT Study", Organometallics, vol. 33, pp. 3320-3327, 2014.
Quignard et al., "Surface Organometallic Chemistry: Synthesis and Characterization of a Tris(neopentyl)zirconium (IV) Complex Grafted to the surface of a Partially Dehydroxylated Silica", Inorg. Chem., vol. 31, pp. 928-930, 1992.
Song et al., "Meso-Zr—Al-beta zeolite as a robust catalysts for cascade reactions in biomass valorization", Applied Catalysts B: Environmental, vol. 205, pp. 393-403, 2017.
Tosin et al., "Reactivity of Silica-Supported Hafnium Trisneopentyl with Dihydrogen: Formation and Characterization of Silica Surface Hafnium Hydrides and Alkyl Hydride", Organometallics, vol. 26, pp. 4118-4127, 2007.
Xu et al., "Bimetallic Pt—Sn nanocluster from hydrogenolysis of a well-defined surface compound consisting of [($\equiv$ AIO-) Pt(COD)Me] and [($\equiv$ AIO-)SnPh3] fragments for propane dehydrogenation", Journal of Catalysis, vol. 374, pp. 391-400, 2019.
Corker et al., "Catalytic Cleavage of the C—H and C—C Bonds of Alkanes by Surface Organometallic Chemistry: An EXAFS and IR Characterization of a Zr—H Catalyst", Science, vol. 271, pp. 966-969, Feb. 16, 1996.
Quignard et al., "Alkane Activation by a Highly Electrophilic Zirconium Hydride Complex Supported on Silica", J. Chem. Soc. Chem. Commun., 2 pgs. 1991.
Laurent et al., From well-defined Pt(II) surface species to the controlled growth of silica supported Pt nanoparticles, Dalton Trans., 2013, 42, 238IDOI: 10.1039/c2dt31639k (Year: 2013).
Notice of Allowance and Fee(s) Due dated Nov. 1, 2022 pertaining to U.S. Appl. No. 17/231,191, filed Apr. 15, 2021, 9 pages.
Notice of Allowance and Fee(s) Due dated Nov. 2, 2022 pertaining to U.S. Appl. No. 17/230,500, filed Apr. 14, 2021, 9 pages.
Notice of Allowance and Fee(s) Due dated Nov. 16, 2022 pertaining to U.S. Appl. No. 17/230,476, filed Apr. 14, 2021, 9 pages.

* cited by examiner

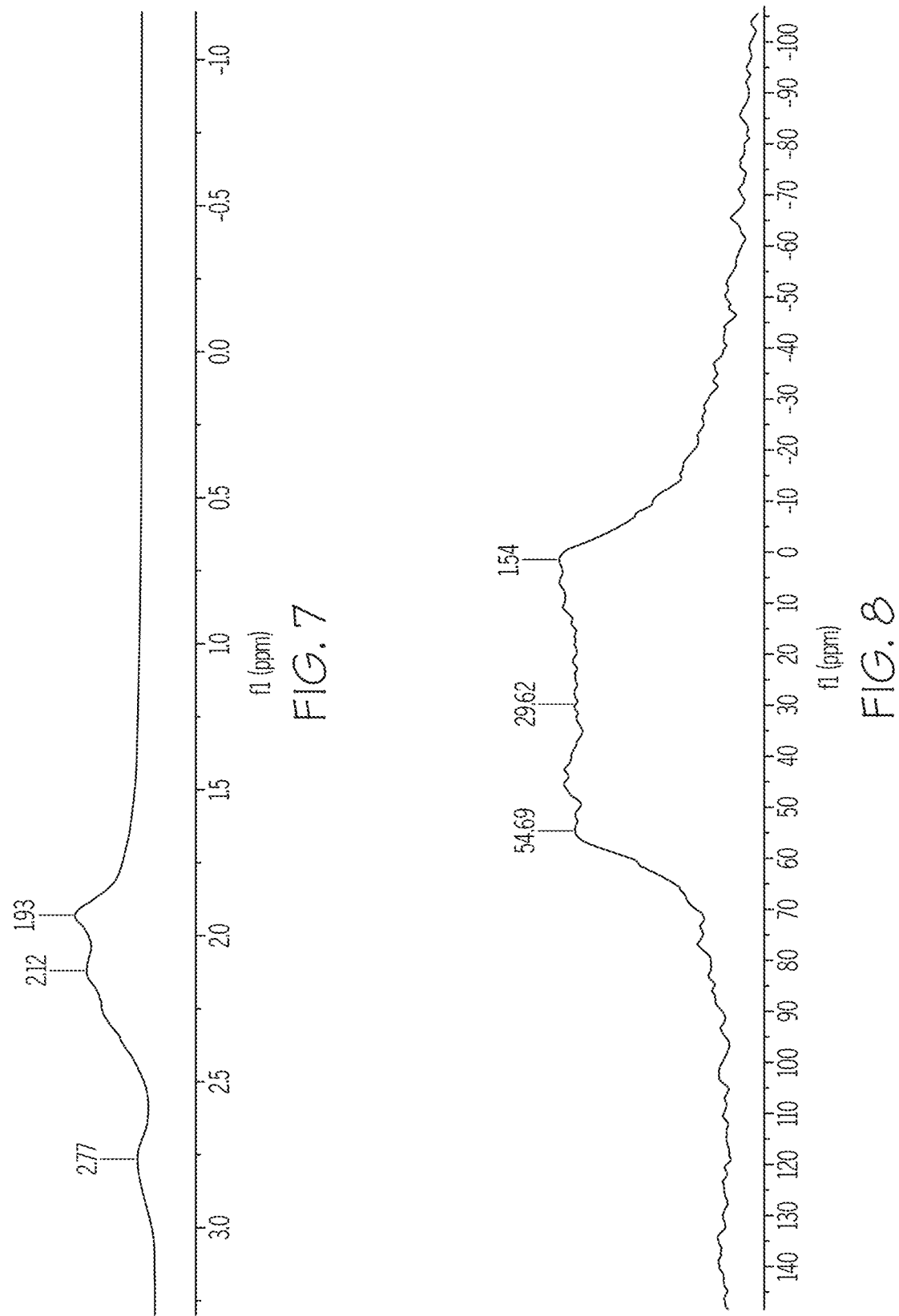

MODIFIED ZEOLITES THAT INCLUDE ZIRCONIUM-CONTAINING ORGANOMETALLIC MOIETIES AND METHODS FOR MAKING SUCH

TECHNICAL FIELD

The present disclosure generally relates to porous materials and, more specifically, to zeolites.

BACKGROUND

Materials that include pores, such as zeolites, may be utilized in many petrochemical industrial applications. For example, such materials may be utilized as catalysts in a number of reactions which convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or Beta.

BRIEF SUMMARY

The present application is directed to modified zeolites that include organometallic moieties. The organometallic moieties described herein may include zirconium. According to various embodiments, the organometallic moieties may be grafted to terminal isolated silanol functionalities of a precursor zeolite, referred to sometimes herein as dehydroxylated zeolites. As such, the modified zeolites described herein may include organometallic moieties whereby the zirconium atom of the organometallic moiety is bonded to an oxygen atom that bridges the zirconium atom and a silicon atom of the microporous framework of the modified zeolite. Such modified zeolites, according to one or more embodiments presently disclosed, may have enhanced or differentiated catalytic functionality as compared with conventional zeolites.

In accordance with one or more embodiments of the present disclosure, a modified zeolite may comprise a microporous framework comprising a plurality of micropores having diameters of less than or equal to 2 nm. The microporous framework may comprise at least silicon atoms and oxygen atoms. The modified zeolite may further comprise organometallic moieties each bonded to bridging oxygen atoms. The organometallic moieties may comprise a zirconium atom. The zirconium atom may be bonded to a bridging oxygen atom, and the bridging oxygen atom may bridge the zirconium atom of the organometallic moiety and a silicon atom of the microporous framework.

In accordance with one or more additional embodiments of the present disclosure, a modified zeolite may be made by a method comprising reacting an organometallic chemical with a dehydroxylated zeolite. The dehydroxylated zeolite may comprise a microporous framework including a plurality of micropores having diameters of less than or equal to 2 nm. The microporous framework may comprise at least silicon atoms and oxygen atoms. The dehydroxylated zeolite may comprise terminal isolated silanol functionalities comprising hydroxyl groups bonded to silicon atoms of the microporous framework. The reacting of the organometallic chemical with the dehydroxylated zeolite may form the modified zeolite including organometallic moieties each bonded to an oxygen atom of the modified zeolite. The organometallic moiety may comprise a portion of the organometallic chemical, and the organometallic chemical may comprise zirconium.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 7 depicts a $^1$H-MAS-NMR spectrum of the dehydroxylated ZSM-5 zeolite of Example 3 according to one or more embodiments described in this disclosure;

FIG. 8 depicts an Aluminum Solid State Nuclear Magnetic Resonance ($^{27}$Al-SS-NMR) spectrum of the dehydroxylated ZSM-5 zeolite of Example 3 according to one or more embodiments described in this disclosure;

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
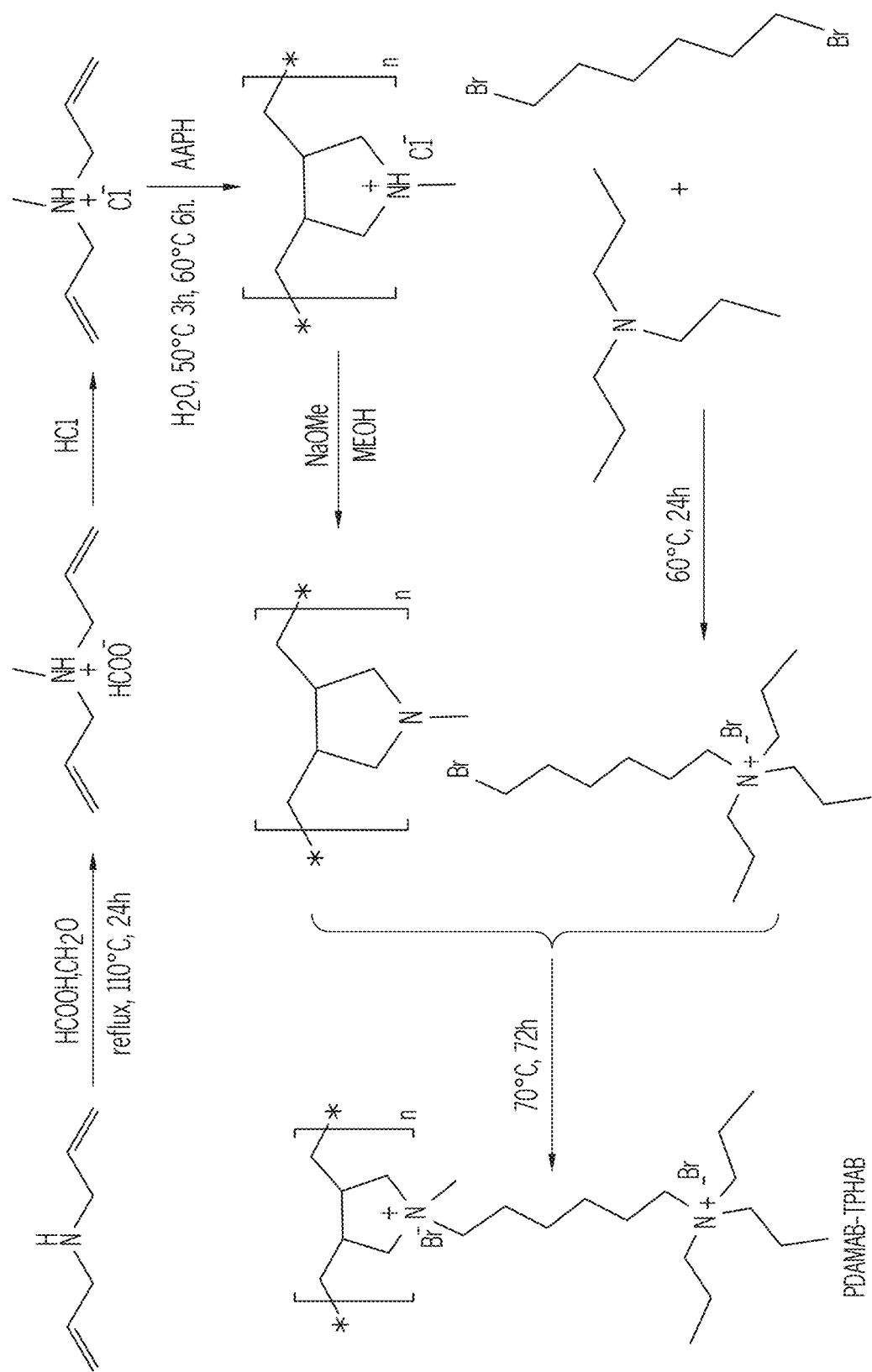
FIG. 1 depicts a reaction pathway to form poly($N^1,N^1$-diallyl-$N^1$-methyl-$N^6,N^6,N^6$-tripropylhexane-1,6-diamonium bromide) (PDAMAB-TMHAB), according to one or more embodiments described in this disclosure.

The present disclosure is directed to zeolites which are modified by the grafting of organometallic moieties to the framework structure of the zeolite. As presently described, the organometallic moieties may include zirconium. As referred to herein, "modified zeolites" refer to zeolites which include organometallic moieties as described herein. According to one or more of the embodiments disclosed herein, the modified zeolite may include an organometallic each bonded to bridging oxygen atoms. The bridging oxygen atom may bridge the zirconium atom of the organometallic moiety and a silicon atom of the microporous framework of the modified zeolite.

According to embodiments disclosed herein, the modified zeolites may be formed by a process that includes dehydroxylating an initial zeolite, and grafting organometallic chemicals to the dehydroxylated zeolite. While embodiments of modified zeolites prepared by this procedure are disclosed herein, embodiments of the present disclosure should not be considered to be limited to modified zeolites made by such a process.

As presently described, "initial" zeolites (which in some embodiments may be mesoporous zeolites) may be supplied or produced, as is presently disclosed. Initial zeolites may include mesopores or be void of mesopores. In embodiments where mesopores are introduced to a zeolite in "top-down" approach, the zeolite with the formed mesopores may be considered the initial zeolite. As described herein, the characterization of the structure and material of the zeolite may equally apply to the initial zeolite as well as the dehydroxylated zeolite and/or modified zeolite. In one or more embodiments, the structure and material composition of the initial zeolite does not substantially change through the dehydroxylation steps and/or organometallic grafting steps (aside from the introduction of the described functionalities formed by the dehydroxylation and/or organometallic moiety grafting steps). For example, the framework type and general material constituents of the framework may be substantially the same in the initial zeolite and the modified zeolite aside from the addition of the organometallic moiety. Likewise, mesoporosity of the initial zeolite may be carried into the modified zeolite. Accordingly, when a "zeolite" is described herein with respect to its structural characterization, the description may refer to the initial zeolite, the dehydroxylated zeolite, and/or the modified zeolite.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size.

Generally, zeolites may be characterized by a framework type which defines their microporous structure. The zeolites described presently, in one or more embodiments, are not particularly limited by framework type. Framework types are described in, for example, "Atlas of Zeolite Framework Types" by Ch. Baerlocher et al, Fifth Revised Edition, 2001, which is incorporated by reference herein.

According to one or more embodiments, the zeolites described herein may include at least silicon atoms and oxygen atoms. In some embodiments, the microporous framework may include substantially only silicon and oxygen atoms (e.g., silica material). However, in additional embodiments, the zeolites may include other atoms, such as aluminum. Such zeolites may be aluminosilicate zeolites. In additional embodiments, the microporous framework may include titanium atoms, and such zeolites may be titanosilicate zeolites.

In one or more embodiments, the zeolite may comprise an aluminosilicate microstructure. The zeolite may comprise at least 99 wt. % of the combination of silicon atoms, oxygen atoms, and aluminum atoms. The molar ratio of Si/Al may be from 2 to 100, such as from 2-25, from 25-50, from 50-75, from 75-100, or any combination of these ranges.

In embodiments, the zeolites may comprise microstructures (which include micropores) characterized by, among others as *BEA framework type zeolites (such as, but not limited to, zeolite Beta), FAU framework type zeolites (such as, but not limited to, zeolite Y), MOR framework type zeolites, or MFI framework type zeolites (such as, but not limited to, ZSM-5). It should be understood that *BEA, MFI, MOR, and FAU refer to zeolite framework types as identified by their respective three letter codes established by the International Zeolite Association (IZA). Other framework types are contemplated in the presently disclosed embodiments.

In one or more embodiments, the zeolite may be an MFI framework type zeolite, such as a ZSM-5. "ZSM-5" generally refers to zeolites having an MFI framework type according to the IZA zeolite nomenclature and consisting majorly of silica and alumina, as is understood by those skilled in the art. ZSM-5 refers to "Zeolite Socony Mobil-5" and is a pentasil family zeolite that can be represented by the chemical formula $Na_nAl_nSi_{96-n}O_{192} \cdot 16H_2O$, where $0<n<27$. According to one or more embodiments, the molar ratio of silica to alumina in the ZSM-5 may be at least 5. For example, the molar ratio of silica to alumina in the ZSM-5 zeolite may be at least 10, at least 12, or even at least 30, such as from 5 to 30, from 12 to 30, from 5 to 80, from 5 to 300, from 5 to 1000, or even from 5 to 1500. Examples of suitable ZSM-5 zeolite include those commercially available from Zeolyst International, such as CBV2314, CBV3024E, CBV5524G, and CBV28014, and from TOSOH Corporation, such as HSZ-890 and HSZ-891.

In one or more embodiments, the zeolite may comprise an FAU framework type zeolite, such as zeolite Y or ultra-stable zeolite Y (USY). As used herein, "zeolite Y" and "USY" refer to a zeolite having a FAU framework type according to the IZA zeolite nomenclature and consisting majorly of silica and alumina, as would be understood by one skilled in the art. In one or more embodiments, USY may be prepared from zeolite Y by steaming zeolite Y at temperatures above 500° C. The molar ratio of silica to alumina may be at least 3. For example, the molar ratio of silica to alumina in the zeolite Y may be at least 5, at least 12, at least 30, or even at least 200, such as from 5 to 200, from 12 to 200, or from about 15 to about 200. The unit cell size of the zeolite Y may be from about 24 Angstrom to about 25 Angstrom, such as 24.56 Angstrom.

In one or more embodiments, the zeolite may comprise a *BEA framework type zeolite, such as zeolite Beta. As used in this disclosure, "zeolite Beta" refers to zeolite having a *BEA framework type according to the IZA zeolite nomenclature and consisting majorly of silica and alumina, as would be understood by one skilled in the art. The molar ratio of silica to alumina in the zeolite Beta may be at least 10, at least 25, or even at least 100. For example, the molar ratio of silica to alumina in the zeolite Beta may be from 5 to 500, such as from 25 to 300.

Along with micropores, which may generally define the framework type of the zeolite, the zeolites may also comprise mesopores. As used herein a "mesoporous zeolite" refers to a zeolite which includes mesopores, and may have an average pore size of from 2 to 50 nm. The presently disclosed mesoporous zeolites may have an average pore size of greater than 2 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the mesoporous zeolites described may range from 2 nm to 40 nm, and the median pore size may be from 8 to 12 nm. In embodiments, the mesopore structure of the zeolites may be fibrous, where the mesopores are channel-like. As described herein, "fibrous zeolites" may comprise reticulate fibers with interconnections and have a dense inner core surrounded by less dense outer fibers. Generally, fibrous zeolites may comprise intercrystalline voids in between the fibers where the voids between the less dense, outer fibers are mesopore sized and give the fibrous zeolite its mesoporosity. The mesoporous zeolites described may be generally silica-containing materials, such as aluminosilicates, pure silicates, or titanosilicates. It should be understood that while mesoporous zeolites are referenced in one or more portions of the present disclosure, some zeolites may not be mesoporous. For example, some embodiments may utilize zeolites which have an average pore size of less than 2 nm, or may not have mesopores in any capacity.

The mesoporous zeolites described in the present disclosure may have enhanced catalytic activity as compared to non-mesoporous zeolites. Without being bound by theory, it is believed that the microporous structures provide for the majority of the catalytic functionality of the mesoporous zeolites described. The mesoporosity may additionally allow for greater catalytic functionality because more micropores are available for contact with the reactant in a catalytic reaction. The mesopores generally allow for better access to microporous catalytic sites on the mesoporous zeolite, especially when reactant molecules are relatively large. For example, larger molecules may be able to diffuse into the mesopores to contact additional catalytic microporous sites.

Additionally, mesoporosity may allow for additional grafting sites on the zeolite where organometallic moieties may be bound. As is described herein, organometallic chemicals may be grafted to the microstructure of the zeolite. Mesoporosity may allow for additional grafting sites, allowing for greater amounts of organometallic functionalities as compared with non-mesoporous zeolites.

In embodiments, the mesoporous zeolites may have a surface area of greater than or equal to 300 $m^2/g$, greater than or equal to 350 $m^2/g$, greater than or equal to 400 $m^2/g$, greater than or equal to 450 $m^2/g$, greater than or equal to 500 $m^2/g$, greater than or equal to 550 $m^2/g$, greater than or equal to 600 $m^2/g$, greater than or equal to 650 $m^2/g$, or even greater than or equal to 700 $m^2/g$, and less than or equal to 1,000 $m^2/g$. In one or more other embodiments, the mesoporous zeolites may have pore volume of greater than or equal to 0.2 $cm^3/g$, greater than or equal to 0.25 $cm^3/g$, greater than or equal to 0.3 $cm^3/g$, greater than or equal to 0.35 $cm^3/g$, greater than or equal to 0.4 $cm^3/g$, greater than or equal to 0.45 $cm^3/g$, greater than or equal to 0.5 $cm^3/g$, greater than or equal to 0.55 $cm^3/g$, greater than or equal to 0.6 $cm^3/g$, greater than or equal to 0.65 $cm^3/g$, or even greater than or equal to 0.7 $cm^3/g$, and less than or equal to 1.5 $cm^3/g$. In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area. In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume. Surface area, average pore size, and pore volume distribution may be measured by $N_2$ adsorption isotherms performed at 77 Kelvin (K) (such as with a Micrometrics ASAP 2020 system). As would be understood by those skilled in the art Brunauer-Emmett-Teller (BET) analysis methods may be utilized.

The mesoporous zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle when viewed in a microscope, where these points may lie on outer surfaces of the particle. The particles may have a particle size from 25 nm to 900 nm, from 25 nm to 800 nm, from 25 nm to 700 nm, from 25 nm to 600 nm, from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be determined by visual examination under a microscope.

The mesoporous zeolites described may be formed in a single-crystal structure, or if not single crystal, may consist of a limited number of crystals, such as 2, 3, 4, or 5. The crystalline structure of the mesoporous zeolites may have a branched, fibrous structure with highly interconnected intracrystalline mesopores. Such structures may be advantageous in applications where the structural integrity of the zeolite is important while the ordering of the mesopores is not.

According to one or more embodiments, the mesoporous zeolites described in the present disclosure may be produced by utilizing cationic polymers, as is subsequently described in the present disclosure, as structure-directing agents. The cationic polymers may function as dual-function templates for synthesizing the mesoporous zeolites, meaning that they act simultaneously as a template for the fabrication of the micropores and as a template for the fabrication of the mesopores.

According to various embodiments, the mesoporous zeolites described in the present disclosure may be produced by forming a mixture comprising the cationic polymer structure-directing agent (SDA), such as PDAMAB-TPHAB, and one or more precursor materials which will form the structure of the mesoporous zeolites. The precursor materials may contain the materials that form the porous structures, such as alumina and silica for an aluminosilicate zeolite, titania and silica for a titanosilicate zeolite, and silica for a pure silica zeolite. For example, the precursor materials may be one or more of a silicon-containing material, a titanium-containing material, and an aluminum-containing material. For example, at least $NaAlO_2$, tetra ethyl orthosilicate, and the cationic polymer may be mixed in an aqueous solution to form an intermediate material that will become a mesoporous aluminosilicate zeolite. It should be appreciated that other precursor materials that include silica, titania, or alumina may be utilized. For example, in other embodiments, tetra ethyl orthosilicate and cationic polymers may be combined to form an intermediate material that will become a silicate mesoporous zeolite; or tetra ethyl orthosilicate, tetrabutylorthotitanate, and cationic polymer may be combined to form an intermediate material that will become a titanosilicate mesoporous zeolite. Optionally, the combined mixture may be heated to form the intermediate material, and may crystallize under autoclave conditions. The intermediate material may comprise micropores, and the cationic polymer may act as a structure-directing agent in the formation of the micropores during crystallization. The intermediate materials may still contain the cationic polymers which may at least partially define the space of the mesopores following their removal. The products may be centrifuged, washed, and dried, and finally, the polymer may be removed by a calcination step. The calcination step may comprise heating at temperatures of at least about 400° C., 500° C., 550° C., or even greater. Without being bound by theory, it is believed that the removal of the polymers forms at least a portion of the mesopores of the mesoporous zeolite, where the mesopores are present in the space once inhabited by the polymers.

The precursor materials of the mixture, or reagents of the sol-gel, generally determine the material composition of the mesoporous zeolites, such as an aluminosilicate, a titanosilicate, or a pure silicate. An aluminosilicate mesoporous zeolite may comprise a molar ratio of Si/Al of greater than or equal to 2 and less than 10,000, greater than or equal to 25 and less than 10,000, greater than or equal to 50 and less than 10,000, greater than or equal to 100 and less than 10,000, greater than or equal to 200 and less than 10,000, greater than or equal to 500 and less than 10,000, greater than or equal to 1,000 and less than 10,000, or even greater than or equal to 2,000 and less than 10,000. In a pure silicate zeolite, a negligible amount or no amount of aluminum is present in the framework of the zeolite, and the Si/Al molar ratio theoretically approaches infinity. As used herein a "pure silicate" refers to a material comprising at least about 99.9 weight percent (wt. %) of silicon and oxygen atoms in the framework of the zeolite. Other materials, including water and sodium hydroxide, may be utilized during the formation of the material but are not present in the framework of the zeolite. A pure silica mesoporous zeolite may be formed by utilizing only silicon-containing materials to form the framework of the zeolite and no aluminum. A titanosilicate porous structure may comprise a molar ratio of Si/Ti of greater than or equal to 30 and less than 10,000, greater than or equal to 40 and less than 10,000, greater than or equal to 50 and less than 10,000, greater than or equal to 100 and less than 10,000, greater than or equal to 200 and less than 10,000, greater than or equal to 500 and less than 10,000, greater than or equal to 1,000 and less than 10,000, or even greater than or equal to 2,000 and less than 10,000. It has been found that PDAMAB-TPHAB cationic polymer, described herein, may be utilized to form mesoporous ZSM-5 zeolites when used with silica and alumina precursor materials, mesoporous TS-1 zeolites when used with a silica and titania precursor, and mesoporous silicalite-I zeolites when used with silica precursors. It has also been found that PDAMAB-TMHAB may be utilized to form mesoporous Beta zeolites when used with silica and alumina precursors.

The cationic polymers presently disclosed may comprise one or more monomers which each comprise multiple cationic functional groups, such as quaternary ammonium cations or quaternary phosphonium cations. The cation functional groups of the monomers may be connected by a hydrocarbon chain. Without being bound by theory, it is believed that the cationic functional groups may form or at least partially aid in forming the microstructure of the mesoporous zeolite (for example, an MFI framework type or BEA framework type) and the hydrocarbon chains and other hydrocarbon functional groups of the polymer may form or at least partially aid in forming the mesopores of the mesoporous zeolite.

The cationic polymers may comprise functional groups which are utilized as SDAs for the fabrication of the zeolite microstructure. Such functional groups, which are believed to form the zeolite microstructure, include quaternary ammonium cations and quaternary phosphonium cations. Quaternary ammonium is generally depicted in Chemical Structure #1 and quaternary phosphonium is generally depicted in Chemical Structure #2.

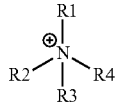

Chemical Structure #1

Generalized Quaternary Ammonium Cation

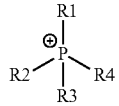

Chemical Structure #2

Generalized Quaternary Phosphonium Cation

As used throughout this disclosure, the encircled plus symbols ("+") show cationic positively charged centers. R groups (including R1, R2, R3, R4, R5, R6, R7, R8, R9, R10, R11, R12, and R13) represent chemical constituents. One or more of the various R groups may be structurally identical or may be structurally different from one another.

In Chemical Structure #1 and Chemical Structure #2, R1, R2, R3, and R4 may include hydrogen atoms or hydrocarbons, such as a hydrocarbon chain, optionally comprising one or more heteroatoms. As used throughout this disclosure, a "hydrocarbon" refers to a chemical or chemical moiety comprising hydrogen and carbon. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of R1, R2, R3, or R4 may represent hydrogen atoms. As used throughout this disclosure, a heteroatom is a non-carbon and non-hydrogen atom. In embodiments, quaternary ammonium and quaternary phosphonium may be present in a cyclic moiety, such as a five-atom ring, a six-atom ring, or a ring comprising a different number of atoms. For example, in Chemical Structure #1 and Chemical Structure #2, the R1 and R2 constituents may be part of the same cyclic moiety.

In one or more embodiments, the two cation moieties may form ionic bonds with anions. Various anionic chemical species are contemplated, including $Cl^-$, $Br^-$, $F^-$, $I^-$, $OH^-$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $BArF^-$. In some embodiments, an anion with a negative charge of more than 1-, such as 2-, 3-, or 4-, may be utilized, and in those embodiments, a single anion may pair with multiple cations of the cationic polymer. As used throughout this disclosure, a fraction listed before an anionic composition means that the anion is paired with more than one cation and may, for example, be paired with the number of cations equal to its negative charge.

In one or more embodiments, two cations of a monomer may be separated from one another by a hydrocarbon chain. The hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

The cationic polymers described in this disclosure are generally non-surfactants. A surfactant refers to a compound that lowers the surface tension (or interfacial tension) between two liquids or between a liquid and a solid, usually by the inclusion of a hydrophilic head and a hydrophobic tail. Non-surfactants do not contain such hydrophobic and hydrophilic regions, and do not form micelles in a mixture containing a polar material and non-polar material. Without being bound by theory, it is believed that the polymers described are non-surfactants because of the inclusion of two or more cation moieties which are joined by a hydrocarbon chain. Such an arrangement has polar charges on or near each end of the monomer, and such an arrangement excludes the hydrophobic segment from the polymer, and thus the surfactant behavior (self-assembly in solution). On the atomic scale, it is believed that the functional groups (for example, quaternary ammoniums) on the polymer direct the formation of zeolite structure; on the mesoscale, the polymer functions simply as a "porogen" rather than a structure directing agent in the conventional sense. As opposed to the cases of surfactants, non-surfactant polymers do not self-assemble to form an ordered mesostructure, which in turn favors the crystallization of zeolites, producing a new class of hierarchical zeolites that feature three-dimensionally (3-D) continuous zeolitic frameworks with highly interconnected intracrystalline mesopores.

In one embodiment, the cationic polymer may comprise the generalized structure depicted in Chemical Structure #3:

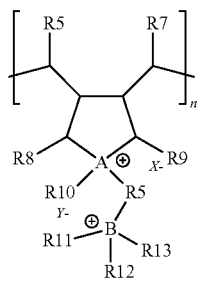

Chemical Structure #3

Generalized Cationic Polymer

Chemical Structure #3 depicts a single monomer of the cationic polymer, which is signified by the included bracket, where n is the total number of repeating monomers in the polymer. In some embodiments, the cationic polymer may be a copolymer comprising two or more monomer structures. The $X^-$ and $Y^-$ of Chemical Structure #3 represent anions. It should be understood that one or more monomers (such as that shown in Chemical Structure #3) of the cationic polymers described in the present application may be different from one another. For example, various monomer units may include different R groups. Referring to Chemical Structure #3, A may represent nitrogen or phosphorus and B may represent nitrogen or phosphorus, R5 may be a branched or unbranched hydrocarbon chain having a carbon chain length of from 1 to 10,000 carbon atoms, such as a 2 to 20 carbon alkane, $X^-$ may be an anion and $Y^-$ may be an anion, and R6, R7, R8, R9, R10, R11, R12, and R13 may be hydrogen atoms or hydrocarbons optionally comprising one or more heteroatoms.

Referring to Chemical Structure #3, in one or more embodiments, A may represent nitrogen or phosphorus and B may represent nitrogen or phosphorus. In one embodiment, A and B may be nitrogen, and in another embodiment, A and B may be phosphorus. For example, A of Chemical Structure #3 may comprise a quaternary ammonium cation or a quaternary phosphonium cation. As shown in Chemical Structure #3, A may be a portion of a ring structure, such as a five-sided ring. In one or more embodiments, $X^-$ and $Y^-$ are anions. For example, $X^-$ may be chosen from $Cl^-$, $Br^-$, $F^-$, $I^-$, $OH^-$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $BArF^-$, and $Y^-$ may be chosen from $Cl^-$, $Br^-$, $F^-$, $I^-$, $OH^-$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $BArF^-$. In embodiments, an anion with a negative charge of more than 1-, such as 2-, 3-, or 4-, may be present, and in those embodiments, a single anion may pair with multiple cations of the cationic polymer.

Still referring to Chemical Structure #3, R5 represents a branched or unbranched hydrocarbon chain. The hydrocarbon chain may be branched or unbranched, and may comprise an alkane hydrocarbon chain, an alkene hydrocarbon chain, or an alkyne hydrocarbon chain. The length of the hydrocarbon chain (measured as the number of carbons in the chain directly connecting A to B) may be from 1 to 10,000 carbon atoms (such as from 1 to 1,000 carbon atoms, from 1 to 500 carbon atoms, from 1 to 250 carbon atoms, from 1 to 100 carbon atoms, from 1 to 50 carbon atoms, from 1 to 25 carbon atoms, from 1 to 20 carbon atoms, from 1 to 15 carbon atoms, from 1 to 10 carbon atoms, from 2 to 10,000 carbon atoms, from 3 to 10,000 carbon atoms, from 4 to 10,000 carbon atoms, from 5 to 10,000 carbon atoms, from 6 to 10,000 carbon atoms, from 8 to 10,000 carbon atoms, from 10 to 10,000 carbon atoms, from 15 to 10,000 carbon atoms, from 20 to 10,000 carbon atoms, from 25 to 10,000 carbon atoms, from 50 to 10,000 carbon atoms, from 100 to 10,000 carbon atoms, from 250 to 10,000 carbon atoms, from 500 to 10,000 carbon atoms, from 2 to 100 carbon atoms, from 3 to 30 carbon atoms, from 4 to 15 carbon atoms, or from 5 to 10 carbon atoms, such as 6 carbon atoms. R5 may comprise one or more heteroatoms, but some embodiments of R5 include only carbon and hydrogen.

In Chemical Structure #3, R6, R7, R8, R9, R10, R11, R12, and R13 may be hydrogen atoms or hydrocarbons optionally comprising one or more heteroatoms, respectively. For example, some of R6, R7, R8, R9, R10, R11, R12, and R13 may be structurally identical with one another and some of R6, R7, R8, R9, R10, R11, R12, and R13 may be structurally different from one another. For example, one or more of R6, R7, R8, R9, R10, R11, R12, and R13 may be hydrogen, or alkyl groups, such as methyl groups, ethyl groups, propyl groups, butyl groups, or pentyl groups. In embodiments, one or more of R6, R7, R8, and R9 may be hydrogen. In embodiments, one or more of R10, R11, R12, and R13 may be an alkyl groups. For example, R10 may be a methyl, ethyl, propyl, or butyl group, and one or more of R11, R12, and R13 may be methyl, ethyl, propyl, or butyl groups. In one embodiment, R10 is a methyl group and R11, R12, and R13 are propyl groups. In one embodiment, R11, R12, and R13 are methyl groups. In another embodiment, R11, R12, and R13 are ethyl groups. In another embodiment, R11, R12, and R13 are propyl groups.

In one or more embodiments, Chemical Structure #3 may be a polymer that comprises n monomer units, where n may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, n may be from 1,000 to 1,000,000.

According to one or more embodiments, the cationic polymer comprises poly($N^1,N^1$-diallyl-$N^1$-alkyl-$N^6,N^6,N^6$-trialkylalkane-1,6-diamonium halide), such as poly($N^1,N^1$-diallyl-$N^1$-methyl-$N^6,N^6,N^6$-trialkylhexane-1,6-diamonium bromide). An example of such is poly($N^1,N^1$-diallyl-$N^1$-methyl-$N^6,N^6,N^6$-tripropylhexane-1,6-diamonium bromide), referred to as (PDAMAB-TPHAB) and shown in Chemical Structure #4.

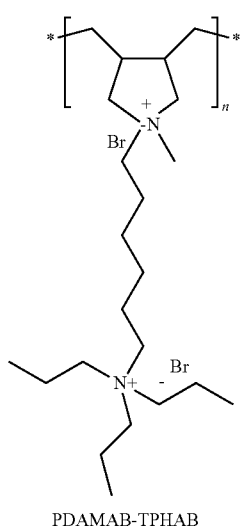

Chemical Structure #4

PDAMAB-TPHAB

In another embodiment, the cationic polymer comprises poly($N^1,N^1$-diallyl-$N^1$-methyl-$N^6,N^6,N^6$-triethylhexane-1,6-diamonium bromide), referred to as (PDAMAB-TEHAB) and shown in Chemical Structure #5.

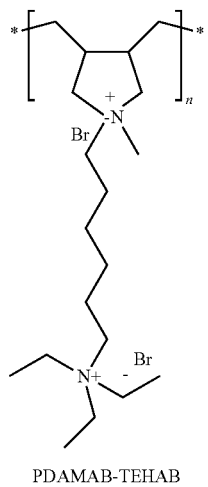

Chemical Structure #5

PDAMAB-TEHAB

In another embodiment, the cationic polymer comprises poly($N^1,N^1$-diallyl-$N^1$-methyl-$N^6,N^6,N^6$-trimethylhexane-1,6-diamonium bromide), referred to as (PDAMAB-TMHAB) and shown in Chemical Structure #6.

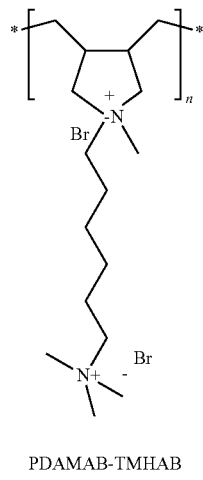

Chemical Structure #6

PDAMAB-TMHAB

The cationic polymers described in the present disclosure, including that of Chemical Structure #3, may be synthesized by a reaction pathway such as that shown in FIG. 1. Specifically, FIG. 1 depicts a reaction pathway for the synthesis of PDAMAB-TPHAB. However, it should be understood that other reaction pathways may be utilized for the synthesis of PDAMAB-TPHAB or other generalized polymers such as the polymer of Chemical Structure #3. Furthermore, it should be understood that the reaction scheme depicted in FIG. 1 may be adapted to form polymers which have a different structure than PDAMAB-TPHAB, such as some polymers included in the generalized Chemical Structure #3 (for example, PDAMAB-TEHAB or PDAMAB-TEHAB). For example, the hydrocarbon chain length between the cation groups A and B of Chemical Structure #3 may be changed by utilizing a different reactant in the scheme of FIG. 1.

Referring to FIG. 1, the cationic polymer of Chemical Structure #3 may be formed by a process comprising forming a diallyl methyl ammonium hydrochloride cation with a chloride anion from diallylamine, polymerizing the diallyl methyl ammonium hydrochloride to form a poly(diallyl methyl ammonium hydrochloride) (PDMAH), forming a poly(diallyl methyl amine) (PDMA) from the poly(diallyl methyl ammonium hydrochloride) (PDMAH), forming an ammonium halide cation with a halide anion by reacting a trialkyl amine, such as a tripropyl amine, with a dihaloalkane, and forming the PDAMAB-TPHAB by reacting the PDMA with the ammonium halide cation. In other embodiments, triethyl amine or trimethyl amine may be utilized as the trialkyl amine.

Still referring to FIG. 1, according to one or more embodiments, the diallyl methyl ammonium hydrochloride cation with a chloride anion may be formed by contacting the diallylamine with formic acid, formaldehyde, and HCl. In other embodiments, the diallyl methyl ammonium hydrochloride may be polymerized by contact with 2,2'-axobis(2-methylpropionamidine) dihydrochloride (AAPH). In additional embodiments, the poly(diallyl methyl amine) (PDMA) may be formed by contacting the poly(diallyl methyl ammonium hydrochloride) (PDMAH) with methane and sodium methoxide.

According to another embodiment, the cationic polymer may be a co-polymer comprising the monomer of the structure depicted in Chemical Structure #3 and the monomer of Chemical Structure #7.

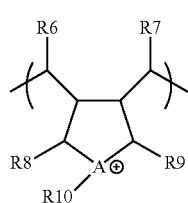

Chemical Structure #7

Referring to Chemical Structure #7, in one or more embodiments, A may represent nitrogen or phosphorus. In one embodiment, A may be nitrogen, and in another embodiment, A may be phosphorus. For example, A of Chemical Structure #7 may comprise a quaternary ammonium cation or a quaternary phosphonium cation. As shown in Chemical Structure #7, A may be a portion of a ring structure, such as a five-sided ring. Anions may be present and be attracted to A or B, or both, for example, anions may be chosen from $Cl^-$, $Br^-$, $F^-$, $I^-$, $OH^-$, $½SO_4^{2-}$, $⅓PO_4^{3-}$, $½S^{2-}$, $AlO_2^-$, $BF_4^-$, $SbF_6^-$, and $BArF^-$. In embodiments, an anion with a negative charge of more than 1-, such as 2-, 3-, or 4-, may be present, and in those embodiments, a single anion may pair with multiple cations of the cationic polymer.

In Chemical Structure #3, R6, R7, R8, R9, R10, may be hydrogen atoms or hydrocarbons optionally comprising one or more heteroatoms, respectively. For example, some of R6, R7, R8, R9, R10 may be structurally identical with one another and some of R6, R7, R8, R9, R10 may be structurally different from one another. For example, one or more of R6, R7, R8, R9, R10, may be hydrogen, or alkyl groups, such as methyl groups, ethyl groups, propyl groups, butyl groups, or pentyl groups. In embodiments, one or more of R6, R7, R8, and R9 may be hydrogen. In embodiments, R10 may be an alkyl group. For example, R10 may be a methyl, ethyl, propyl, or butyl group. In one embodiment, R10 is a methyl group.

An embodiment of cationic polymers comprising the monomer of the structure depicted in Chemical Structure #3 and the monomer of Chemical structure #7 is depicted in Chemical Structure #8.

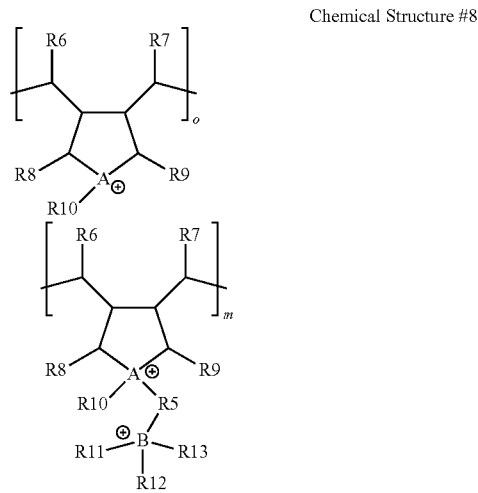

Chemical Structure #8

As depicted in Chemical Structure #8, the co-polymer may include the monomeric component of Chemical Structure #3 in "m" parts and the monomeric component of Chemical structure #7 in "o" parts. According to embodiments, the ratio of m/(o+m) may be equal to from 0 to 100%. For example, when m/(o+m)=0%, the cationic polymer may include only the monomeric components depicted in Chemical Structure #7, and when m/(o+m)=100%, the cationic polymer may include only the monomeric components depicted in Chemical Structure #3. In additional embodiments, m/(o+m) may be equal to from 0 to 25%, from 25% to 50%, from 50% to 75%, or from 75% to 100%. In some embodiments, m/(o+m) may be equal to from 25% to 75%, or from 60% to 70%.

In one or more embodiments, Chemical Structure #7 may be a co-polymer that comprises (o+m) monomer units, where (o+m) may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, (o+m) may be from 1,000 to 1,000,000.

The monomer of Chemical Structure #8 may, in one embodiment, be formed by supplying a lesser molar amount of ammonium halide cation, such that only a portion of the PDMA reacts with ammonium halide cation. In such an embodiment, the non-cation substituted PDMA monomers are representative of the monomers of Chemical Structure #7 and the cation substituted monomers are representative of the monomers of Chemical Structure #3.

According to one or more embodiments disclosed herein, the zeolites described above, either mesoporous zeolites or conventional non-mesoporous zeolites may serve as an "initial zeolite" which is then dehydroxylated, forming a dehydroxylated zeolite. In general, the initial zeolite may refer to a zeolite which is not substantially dehydroxylated and includes at least a majority of vicinal hydroxyl groups. Dehydroxylation, as is commonly understood by those skilled in the art, involves a reaction whereby a water molecule is formed by the release of a hydroxyl group and its combination with a proton. The initial zeolite may primarily comprise vicinal silanol functionalities. In one or more embodiments, dehydroxylating the initial zeolite may form terminal isolated silanol functionalities comprising hydroxyl groups bonded to silicon atoms of the microporous framework of the dehydroxylated zeolite. Such isolated silanol functionalities may be expressed as ≡Si—O—H.

As described herein "silanol functionalities" refer to ≡Si—O—H groups. Silanol groups generally include a silicon atom and a hydroxyl group (—OH). As described herein, "terminal" functionalities refer to those that are bonded to only one other atom. For example, the silanol functionality may be terminal by being bonded to only one other atom such as a silicon atom of the microporous framework. As described herein, "isolated silanol functionalities" refer to silanol functionalities that are sufficiently distant from one another such that hydrogen-bonding interactions are avoided with other silanol functionalities. These isolated silanol functionalities are generally silanol functionalities on the zeolite that are non-adjacent to other silanol functionalities. Generally, in a zeolite that includes silicon and oxygen atoms, "adjacent silanols" are those that are directly bonded through a bridging oxygen atom. Isolated silanol functionalities may be identified by FT-IR and/or $^1$H-NMR, as would be understood by those skilled in the art. For example, isolated silanol functionalities may be characterized by a sharp and intense FT-IR band at about 3749 cm$^{-1}$ and/or a $^1$H-NMR shift at about 1.8 ppm. In the embodiments described herein, peaks at or near 3749 cm$^{-1}$ in FT-IR and/or at or near 1.8 ppm in $^1$H-NMR may signify the existence of the dehydroxylated zeolite, and the lack of peaks at or near these values may signify the existence of the initial zeolite.

Isolated silanol functionalities can be contrasted with vicinal silanol functionalities, where two silanol functionalities are "adjacent" one another by each being bonded with a bridging oxygen atom. Chemical Structure #9 depicts an isolated silanol functionality and Chemical Structure #10 depicts a vicinal silanol functionality. Hydrogen bonding occurs between the oxygen atom of one silanol functionality and the hydrogen atom of an adjacent silanol functionality in the vicinal silanol functionality. Vicinal silanol functionality may show a different band in FT-IR and $^1$H-NMR, such as 3520 cm$^{-1}$ or 3720 cm$^{-1}$ in FT-IR, and 2.7 ppm in $^1$H-NMR.

Chemical Structure #9

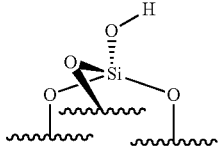

Chemical Structure #10

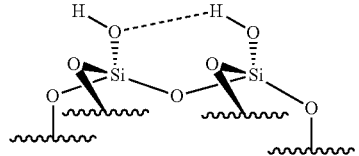

As described herein, a "dehydroxylated zeolite" refers to a zeolitic material that has been at least partially dehydroxylated (i.e., H and O atoms are liberated from the initial zeolite and water is released). Without being bound by theory, it is believed that the dehydroxylation reaction forms a molecule of water from a hydroxyl group of a first silanol and a hydrogen of a second silanol of a zeolite. The remaining oxygen atom of the second silanol functionality forms a siloxane group in the zeolite (i.e., (≡Si—O—Si≡), sometimes referred to as strained siloxane bridges. Generally, strained siloxane bridges are those formed in the dehydroxylation reaction and not in the formation of the initial zeolite.

In one or more embodiments, the initial zeolite (as well as the dehydroxylated zeolite) comprises aluminum in addition to silicon and oxygen. For example, ZSM-5 zeolite may include such atoms. In embodiments with aluminum present, the microporous framework of the dehydroxylated zeolite may include Bronsted acid silanol functionalities. In the Bronsted acid silanol functionalities, each oxygen atom of the Bronsted acid silanol functionality may bridge a silicon atom and an aluminum atom of the microporous framework. Such Bronsted acid silanol functionalities may be expressed as [≡Si—O(H)→Al≡].

Chemical Structure #11 depicts an example of an aluminosilicate zeolite framework structure that includes the terminal isolated silanol functionalities and Bronsted acid silanol functionalities described herein.

Chemical Structure #11

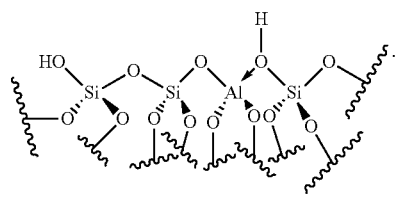

According to one or more embodiments, the dehydroxylation of the initial zeolite may be performed by heating the initial zeolite at elevated temperatures under vacuum, such as from 700° C. to 1100° C. It is believed that according to one or more embodiments described herein, heating at temperatures below 650° C. may be insufficient to form terminal isolated silanol functionalities. However, heating at temperatures greater than 1100° C. may result in the elimination of terminal isolated silanol functionalities, or the production of such functionalities in low enough concentrations that further processing by contact with organometallic chemicals to form organometallic moieties is not observed, as is described subsequently herein.

According to embodiments, the temperature of heating may be from 650° C. to 700° C., from 700° C. to 750° C., from 750° C. to 800° C., from 800° C. to 850° C., from 850° C. to 900° C., from 900° C. to 950° C., from 950° C. to 1000° C., from 1000° C. to 1050° C., from 1050° C. to 1100° C., or any combination of these ranges. For example, temperature ranges from 650° C. to any named value are contemplated, and temperature ranges from any named value to 1100° C. are contemplated. As described herein, vacuum pressure refers to any pressure less than atmospheric pressure. According to some embodiments, the pressure during the heating process may be less than 10$^{-2}$ mbar, less than 10$^{-2.5}$ mbar, less than 10$^{-3}$ mbar, less than 10$^{-3.5}$ mbar, less than 10$^{-4}$ mbar, or even less than 10$^{-4.5}$ mbar. The heating times may be sufficiently long such that the zeolite is brought to thermal equilibrium with the oven or other thermal apparatus utilized. For example, heating times of greater than 8 hours, greater than 12 hours, or greater than 18 hours may be utilized. For example, 24 hours of heating time may be utilized.

Without being bound by any particular theory, it is believed that greater heating temperatures during dehydroxylation correlate with reduced terminal silanols present on the dehydroxylated zeolite. However, it is believed that greater heating temperatures during dehydroxylation correlate with greater amounts of strained siloxanes. For example, when the initial zeolite is heated at 700° C. during dehydroxylation, the concentration of isolated silanol groups may be at least 0.4 mmol/g, such as approximately 0.45 mmol/g in some embodiments, as measured by methyl lithium titration. Dehydroxylating at 1100° C. may result in much less isolated silanol and much less isolated Bronsted acid silanol. In some embodiments, less than 10% of the terminal isolated silanol groups present at 700° C. dehydroxylation are present when 1100° C. dehydroxylation heating is used. However, it is believed that strained siloxane groups are appreciably greater at these greater dehydroxylation temperatures.

According to one or more of the embodiments disclosed herein, the dehydroxylated zeolite is reacted with an organometallic chemical. This process may be referred to as the organometallic moiety grafting step. As presently described, an "organometallic chemical" refers to any chemical comprising both metal and organic constituents, as would be understood by one skilled in the art. The organometallic moieties grafted to the zeolitic framework structure comprise a portion of the organometallic chemical. The organometallic chemical, as described herein, can be thought of as a precursor to the grafted organometallic moiety. According to embodiments, the organometallic chemical reacts with the dehydroxylated zeolite to form the organometallic moiety. The reacting of the organometallic chemical with the dehydroxylated zeolite may form the modified zeolite comprising organometallic moieties. Each of the organometallic moieties may be bonded to an oxygen atom of the modified zeolite. As presently described, the "organometallic moiety" may be any chemical group comprising a metal atom and some organic constituent. Generally, the metal atom of the organometallic moiety may be bonded to a bridging oxygen atom. The organometallic moieties, as described herein, may be derived from an organometallic chemical that is reacted with the dehydroxylated zeolite.

Chemical Structure #12, shown below, generally depicts one reaction which is contemplated to take place when the dehydroxylated zeolite is contacted by the organometallic chemical. In Chemical Structure #12, $MR_1R_2R_3R_4$ is representative of an organometallic chemical, where M is a metal atom and $R_1$, $R_2$, $R_3$, and $R_4$ are ligands bonded to the metal. It should be understood that, depending upon the metal, less than four or greater than four ligands may be present in the organometallic chemical. Still referring to Chemical Structure #12, the organometallic chemical is reacted with the dehydroxylated zeolite and the resulting modified zeolite includes the organometallic moiety. The organometallic moiety is generally shown as $-MR_2R_3R_4$. In the grafting reaction of Chemical Structure #12, the $R_1$ ligand is bonded with a hydrogen atom of a hydroxyl group of the dehydroxylated zeolite and forms a bi-product depicted in Chemical Structure #12 as $R_1$—H. As depicted, the modified zeolite may include the organometallic moiety each bonded to bridging oxygen atoms. The bridging oxygen atom may bridge the metal atom of the organometallic moiety and a silicon atom of the microporous framework of the modified zeolite. As described herein, "bridging" atoms are those which are bonded to at least two other atoms. For example, the bridging oxygen atoms described herein may be bonded with a silicon atom of the microporous framework as well as the metal atom of the organometallic moiety. Bridging atoms may be contrasted with terminal atoms or moieties, which are only bonded to a single other atom. As used herein, "bridging" refers to direct bonding to the two or more other atoms or moieties.

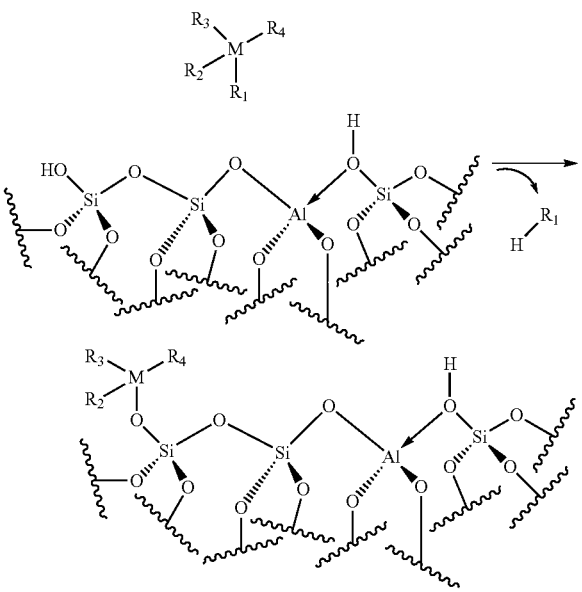

Chemical Structure #12

According to one or more of the embodiments disclosed herein, the organometallic moiety grafting step, as depicted in Chemical Structure #12, may take place by liquid impregnation of the organometallic chemical. The organometallic chemical may be in a solution with a dry solvent such as n-pentane. In some embodiments, the impregnation process may be performed at or near room temperature under stirring for several hours, such as from 3 to 10 hours. Following impregnation, the modified zeolite may be washed and dried. Other grafting methods are contemplated besides wet impregnation, and the grafting technique should not be necessarily limiting on the modified zeolite structure or methods of making such. For example, in one or more embodiments, the organometallic moiety grafting step may take place by sublimation of the organometallic compound if the organometallic compound is sufficiently volatile.

Without being bound by theory, it is believed that the organometallic moiety grafting described herein, where organometallic moieties are bonded to bridging oxygen atoms, may take place only when terminal isolated silanol groups are present on the zeolite. Thus, it is believed that methods which do not utilize a dehydroxylation step which promotes the formation of terminal isolated silanol functionalities will not be successful in organometallic moiety grafting as presently disclosed.

In one or more embodiments, substantially all of the terminal isolated silanol groups of the dehydroxylated zeolite may be reacted. For example, if the concentration of terminal isolated silanol groups is at least 0.4 mmol/g, the concentration of organometallic moieties may be at least 0.4 mmol/g. It is also contemplated that, according to some embodiments, not all terminal isolated silanol groups are reacted. According to embodiments, at least 50%, at least 60%, at least 70%, at least 80%, at least 90%, at least 95%, or at least 99% of terminal isolated silanol groups of the dehydroxylated zeolite are reacted in the organometallic grafting step. According to one or more embodiments, the modified zeolite may comprise at least 0.25 mmol/g, at least 0.3 mmol/g, at least 0.35 mmol/g, at least 0.4 mmol/g, or even at least 0.45 mmol/g of the organometallic moieties.

In one or more embodiments, since the organometallic moiety of the modified zeolite is bonded with an oxygen from a terminal isolated silanol group of the dehydroxylated zeolite, dehydroxylation conditions that form relatively greater amounts of terminal isolated silanol groups may be desired. For example, as described herein, temperatures near 700° (such as 650° C. to 900° C.) for dehydroxylation may be utilized to form greater amounts of terminal isolated silanol groups. In one or more embodiments, dehydroxylation heating temperatures may be less than or equal to 900° C., less than or equal to 850° C., less than or equal to 800° C., or less than or equal to 750° C.

In one or more embodiments, the organometallic moieties may comprise zirconium. In one or more embodiments, the organometallic moieties may comprise a zirconium compound that may have a chemical formula of $ZrR_1R_2R_3$. In one or more embodiments $R_1$ may be a functional group. For example, $R_1$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group. In one or more embodiments, $R_2$ may be a functional group. For example, $R_2$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group. In one or more embodiments, $R_3$ may be a functional group. For example, $R_3$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group.

In one or more embodiments, organometallic moieties and organometallic chemicals may comprise one or more functional groups. As described herein, a "parent" atom or molecule refers to the atom or molecule to which a described functional group or other moiety is bonded. In one or more embodiments, the parent atom or molecule may comprise zirconium.

As described herein, an "alkyl group" may be a functional group derived from an alkane. Generally, alkanes may be saturated hydrocarbons that may contain carbon-carbon single bonds. In one or more embodiments, an alkyl group may derive from an alkane comprising one or more carbon atoms. For example, the alkyl group may comprise a methyl, ethyl, propyl, butyl, n-pentyl, n-hexyl, n-heptyl, n-octyl, n-nonyl, or n-decyl group. In one or more embodiments, the alkyl group may be derived from a branched alkane of at least three carbon atoms. For example, the alkyl group may comprise an isopropyl, isobutyl, tertbutyl, isopentyl, or neopentyl group. In one or more embodiments, alkyl groups may have one or more isomers and, any isomers of an alkyl group may be bound to the parent atom. In one or more embodiments the alkyl group may comprise a cycloalkane. For example, the alkyl group may comprise a cyclobutyl, cyclopentyl, cyclohexyl, cyclooctyl, cyclononyl, or cyclodecyl group.

As described herein, a "hydride group" may be a hydrogen atom with a negative formal charge. In one or more embodiments the hydride group may have nucleophilic, reducing, or basic properties.

As described herein, a "hydroxyl group" may be a functional group that may comprise oxygen bonded to hydrogen. In one or more embodiments, a hydroxyl group may have the chemical formula OH. In one or more embodiments, the oxygen atom of the hydroxyl group may be bonded to the parent atom or molecule.

As described herein, an "alkoxy group" may be a functional group with the chemical formula OR, where R comprises an alkyl group. In one or more embodiments, the oxygen atom of the alkoxy group may be bonded to the parent atom or molecule.

As described herein, an "aryloxy group" may be a functional group with the chemical formula OR, where R comprises an aryl group. In one or more embodiments, the oxygen atom of the aryloxy group may be bonded to the parent atom or molecule.

As described herein, an "allyl group" may be a functional group comprising a methylene bridge between a vinyl group and the parent atom or molecule. In one or more embodiments, an allyl group may have the chemical formula $H_2C=CH-CH_2R$, where R is the parent atom or molecule.

As described herein, a "cyclopentadienyl group" may be a functional group comprising an aromatic with the chemical formula $[C_5H_5]^-$. In one or more embodiments, one or more of the hydrogen atoms of the cyclopentadienyl group may be replaced by one or more functional groups. For example, the cyclopentadienyl group may be a pentamethyl cyclopentadienyl group or substituted cyclopentadienyl group. In one or more embodiments, the parent atom or molecule may replace one of the hydrogen atoms in the cyclopentadienyl group. In one or more embodiments, the parent atom or molecule may comprise a metal and may form an organometallic complex with the cyclopentadienyl group without replacing one of the hydrogen atoms of the cyclopentadienyl group.

As described herein, an "amino group" may be a functional group comprising a nitrogen atom where the nitrogen atom is bonded to the parent atom or molecule. In one or more embodiments, the amino group may have a chemical formula of $NR_1R_2$, where $R_1$ may be an organic functional group or a hydrogen atom and $R_2$ may be an organic functional group or a hydrogen atom. In one or more embodiments, $R_1$ and $R_2$ may be methyl groups. In one or more embodiments, $R_1$ and $R_2$ may be hydrogen atoms.

As described herein, an "amido group" may be a functional group having a chemical formula of $C(=O)NR_1R_2$, where $R_1$ may be an organic functional group or a hydrogen atom and $R_2$ may be an organic functional group or a hydrogen atom. In one or more embodiments, $R_1$ and $R_2$ may be methyl groups. In one or more embodiments, $R_1$ and $R_2$ may be hydrogen atoms. In one or more embodiments, the carbon atom may be bonded to the parent atom or molecule.

As described herein, an "imido group" may be a functional group comprising a nitrogen atom bonded to two acyl groups. As described herein, an "acyl group" may be a functional group comprising an oxygen atom bonded to an alkyl group by a double bond. In one or more embodiments, the nitrogen atom of the imido group may be bonded to the parent atom or molecule. In one or more embodiments, the imido group may be a cyclic functional group.

As described herein, a "nitrido group" may be a functional group comprising a nitrogen atom that may have an oxidation state of −3. In one or more embodiments, the nitrogen atom may be bonded to the parent atom or molecule. In one or more embodiments, the nitrido group may comprise a nitrogen atom bonded only to transition metals.

As described herein, a "carbene group" may be a functional group comprising a carbon atom with two unshared valence electrons. In one or more embodiments, the carbon atom with two unshared valence electrons may be bonded to the parent atom or molecule by a single covalent bond. In one or more embodiments, the carbon atom with two unshared valence electrons may be bonded to the parent atom or molecule by a double covalent bond.

As described herein, a "carbyne group" may be a functional group comprising a carbon atom with three non-bonded electrons. In one or more embodiments, the carbon atom may be bonded to the parent atom or molecule by a single covalent bond.

As described herein, a "halogen group" may be a functional group comprising fluorine, chlorine, bromine, iodine, or astatine. In one or more embodiments, a halogen comprising fluorine, chlorine, bromine, iodine, or astatine may be bonded to the parent atom or molecule.

As described herein, a "benzyl group" may be a functional group comprising a benzene ring attached to a $CH_2$ group. In one or more embodiments, a benzyl group may have the chemical formula $C_6H_5CH_2$. In one or more embodiments, one or more of the hydrogen atoms of the benzyl group may be replaced by one or more functional groups. In one or more embodiments, the $CH_2$ group may be bonded to the parent atom or molecule.

As described herein, a "phenyl group" may comprise a benzene ring. In one or more embodiments, a phenol group may have a chemical formula of $C_6H_5$. In one or more embodiments, one or more of the hydrogen atoms of the phenyl group may be replaced by one or more functional groups. In one or more embodiments, a carbon atom of the phenyl group may be bonded to the parent atom or molecule.

As described herein, an "oxo group" may be a functional group that may comprise oxygen. In one or more embodiments, the oxide group may have a chemical formula of R=O, where R is the parent atom or molecule.

In one or more embodiments, each of $R_1$, $R_2$, and $R_3$ may be an alkyl group. In one or more embodiments, each of $R_1$, $R_2$, and $R_3$ may be the same alkyl group. In one or more embodiments, $R_1$, $R_2$, and $R_3$ may be a neopentyl group. In one or more embodiments, the organometallic moieties may comprise tris(neopentyl)zirconium.

In one or more embodiments, the organometallic chemical may comprise zirconium. In one or more embodiments, the organometallic chemical may comprise a zirconium compound that may have a chemical formula of $ZrR_1R_2R_3R_4$. In one or more embodiments $R_1$ may be a functional group. For example, $R_1$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group. In one or more embodiments, $R_2$ may be a functional group. For example, $R_2$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group. In one or more embodiments, $R_3$ may be a functional group. For example, $R_3$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group. In one or more embodiments, $R_4$ may be a functional group. For example, $R_4$ may be an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group.

In one or more embodiments, each of $R_1$, $R_2$, $R_3$ and $R_4$ may be an alkyl group. In one or more embodiments, each of $R_1$, $R_2$, $R_3$ and $R_4$ may be the same alkyl group. In one or more embodiments, $R_1$, $R_2$, $R_3$ and $R_4$ may be a neopentyl group. In one or more embodiments, the organometallic chemical may comprise tetrakis(neopentyl)zirconium.

In one or more further embodiments, the organometallic chemical may be any of the zirconium compounds disclosed in Chemical Structures 13-18. For example, in one or more embodiments, the organometallic chemical may comprise amino groups, as displayed in Chemical Structures 13 and 14. In one or more embodiments, the organometallic chemical may comprise alkyl groups, as displayed in Chemical Structures 13-18. Additionally, the organometallic chemicals may comprise aromatic groups including cyclopentadienyl groups, as displayed in Chemical Structures 16 and 17.

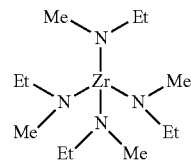

Chemical Structure 13

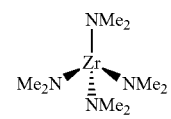

Chemical Structure 14

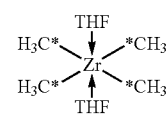

Chemical Structure 15

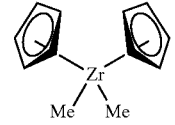

Chemical Structure 16

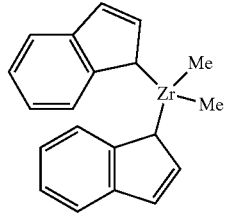

Chemical Structure 17

Chemical Structure 18

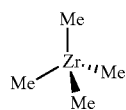

As previously described herein, zeolites generally comprise crystalline atomic arrangements, as opposed to amorphous arrangement. Without being bound by theory, it is believed that isolated silanol moieties may not be formed on non-crystalline materials when heated. As such, it is believed that the grafting of the organometallic chemical to form the organometallic moiety on the modified zeolite may not occur on non-crystalline materials.

Additionally, as previously disclosed herein, the modified zeolite, as well as the zeolitic precursors, may comprise mesopores. The mesopores may allow for grafting of the organometallic chemicals throughout the interior of the modified zeolite. In order to access such interior sites, the mesopores may be at least as large as the organometallic chemical. For example, the average pore size of the modified zeolite (dehydroxylated zeolite or initial zeolite) may be at least 0.5 nm, at least 1 nm, at least 2 nm, at least 3 nm, at least 4 nm, at least 5 nm, or even at least 10 nm greater than the size of the organometallic chemical.

It should be understood that, according to one or more embodiments, presently disclosed, the various functional groups of the zeolites may be identified by FT-IR and/or $^1$H-NMR methods. When a zeolite "comprises" such a moiety, such inclusion may be evidenced by a peak at or near the bands in FT-IR and/or $^1$H-NMR corresponding to such moiety. Such detection methods would be understood by those skilled in the art.

In one or more embodiments, the presently disclosed modified zeolites may be suitable for use as catalysts in refining, petrochemicals, and chemical processing. For example, zeolites may be useful as cracking catalysts in processes such as hydrocracking or fluid catalytic cracking. Table 1 shows some contemplated catalytic functionality for the presently disclosed modified zeolites, and provides the type of zeolite that may be describable. However, it should be understood that the description of Table 1 should not be construed as limiting on the possible uses for modified zeolites presently disclosed.

In embodiments where mesopores are present in the modified zeolite, relatively large hydrocarbons, such as vacuum gas oils, may have access to interior catalytic sites on the modified zeolites. Additionally, since organometallic moieties may be present in the interior regions where relatively large hydrocarbons may diffuse, the relatively large hydrocarbons may have additional contacting with the organometallic moieties, which may promote additional or alternative catalytic functionality as compared with the catalytic sites on the zeolite framework.

According to additional embodiments, the presently disclosed modified zeolites may be suitable for use in separation and/or mass capture processes. For example, the presently disclosed modified zeolites may be useful for adsorbing $CO_2$ and for separating p-xylene from its isomers.

According to embodiments, the metal in the organometallic moiety may improve stability of the material, particularly if used as a catalyst. Zeolitic catalysts may be exposed to relatively high heat during reaction, it is believed that the presently disclosed modified zeolites may exhibit less aging and may have a longer service time before becoming temporarily or permanently deactivated.

EXAMPLES

The various embodiments of methods and systems for forming functionalized zeolites will be further clarified by the following examples. The examples are illustrative in nature and should not be understood to limit the subject matter of the present disclosure.

Example 1—Synthesis of PDAMAB-TPHAB Cationic Polymer

A generalized reaction sequence for producing PDAMAB-TPHAB is depicted in FIG. 1. Each step in the synthesis is described in the context of FIG. 1.

In a first step, a methyl amine monomer was synthesized. Diallylamine (1 part equivalent, 0.1 mol) was slowly added to a solution of formic acid (5 equivalent, 0.5 mol) that was cooled to 0° C. in a 500 milliliter (mL) round-bottom flask. To the resulting clear solution a formaldehyde solution (37% solution; 3 equivalent, 0.3 mol) was added and the mixture was stirred at room temperature for 1 hour. Then, the flask was connected to a reflux condenser and the reaction mix-

TABLE 1

| Catalytic Reaction | Target Description | Framework of zeolite components of Catalyst |
| --- | --- | --- |
| Catalytic cracking | To convert high boiling, high molecular mass hydrocarbon fractions to more valuable gasoline, olefinic gases, and other products | FAU, MFI |
| Hydrocracking | To produce diesel with higher quality | BEA, FAU |
| Gas oil hydrotreating/Lube hydrotreating | Maximizing production of premium distillate by catalytic dewaxing | FAU, MFI |
| Alkane cracking and alkylation of aromatics | To improve octane and production of gasolines and BTX | MFI |
| Olefin oligomerization | To convert light olefins to gasoline & distillate | FER, MFI |
| Methanol dehydration to olefins | To produce light olefins from methanol | CHA, MFI |
| Heavy aromatics transalkylation | To produce xylene from C9+ | FAU, MFI |
| Fischer-Tropsch Synthesis FT | To produce gasoline, hydrocarbons, and linear alpha-olefins, mixture of oxygenates | MFI |
| $CO_2$ to fuels and chemicals | To make organic chemicals, materials, and carbohydrates | MFI | ture was heated overnight at 110° C. After, the solution was cooled and aqueous HCl (4 N, 2 equivalent, 0.9 mol, 225 mL) was added. The crude reaction product was evaporated to dryness under reduced pressure.

In a second step, a poly(diallyl methyl amine) (PDMA) was synthesized. A 50% aqueous solution of the monomer diallyl methyl ammonium hydrochloride with 3.2% initiator of 2,2'-azobis(2-methylpropionamidine) dihydrochloride (AAPH) was purged with nitrogen for 20 minutes (min). Afterwards, the reaction was stirred under nitrogen atmosphere at 50° C. for 3 hours, and then the reaction was increased to 60° C. for another 6 hours. The product poly (diallyl methyl ammonium hydrochloride) (PDMAH) was purified by dialysis and the water was removed on the rotary evaporator under reduced pressure. Then, the PDMAH (1 part equivalent with respect to monomer unit) was dissolved in a minimum amount of methanol and placed in an ice bath. Subsequently, sodium methoxide (1 part equivalent) dissolved in a minimum amount of methanol, was added. The reaction was stored in a freezer for 1 hour. The PDMA methanol solution was obtained after removing the NaCl with centrifugation.

In a third step, 6-bromo-N,N,N-tripropylhexan-1-aminium bromide (BTPAB) was synthesized. A tripropyl amine (0.05 mol)/toluene mixture (1:1 volume/volume (v/v)) was added to 1,6-dibromohexane (0.1 mol)/acetonitrile (1:1 v/v) slowly at 60° C. under magnetic stirring, and kept at this temperature for 24 hours. After cooling to room temperature and solvent evaporation, the obtained BTPAB was extracted through a diethyl ether-water system that separates excess 1, 6-dibromohexane from the mixture.

In a fourth step, PDAMAB-TPHAB was synthesized. For the synthesis of PDAMAB-TPHAB, 1 part equivalent of PDMA (with respect to monomer unit) in methanol was dissolved with 1 part equivalent of BTPAB in acetonitrile/ toluene (40 mL, v:v=1:1) and refluxed at 70° C. for 72 hours under magnetic stirring. After cooling to room temperature and then solvent evaporation, the obtained PDAMAB-TPHAB was further purified by dialysis method in water.

Figure 2:
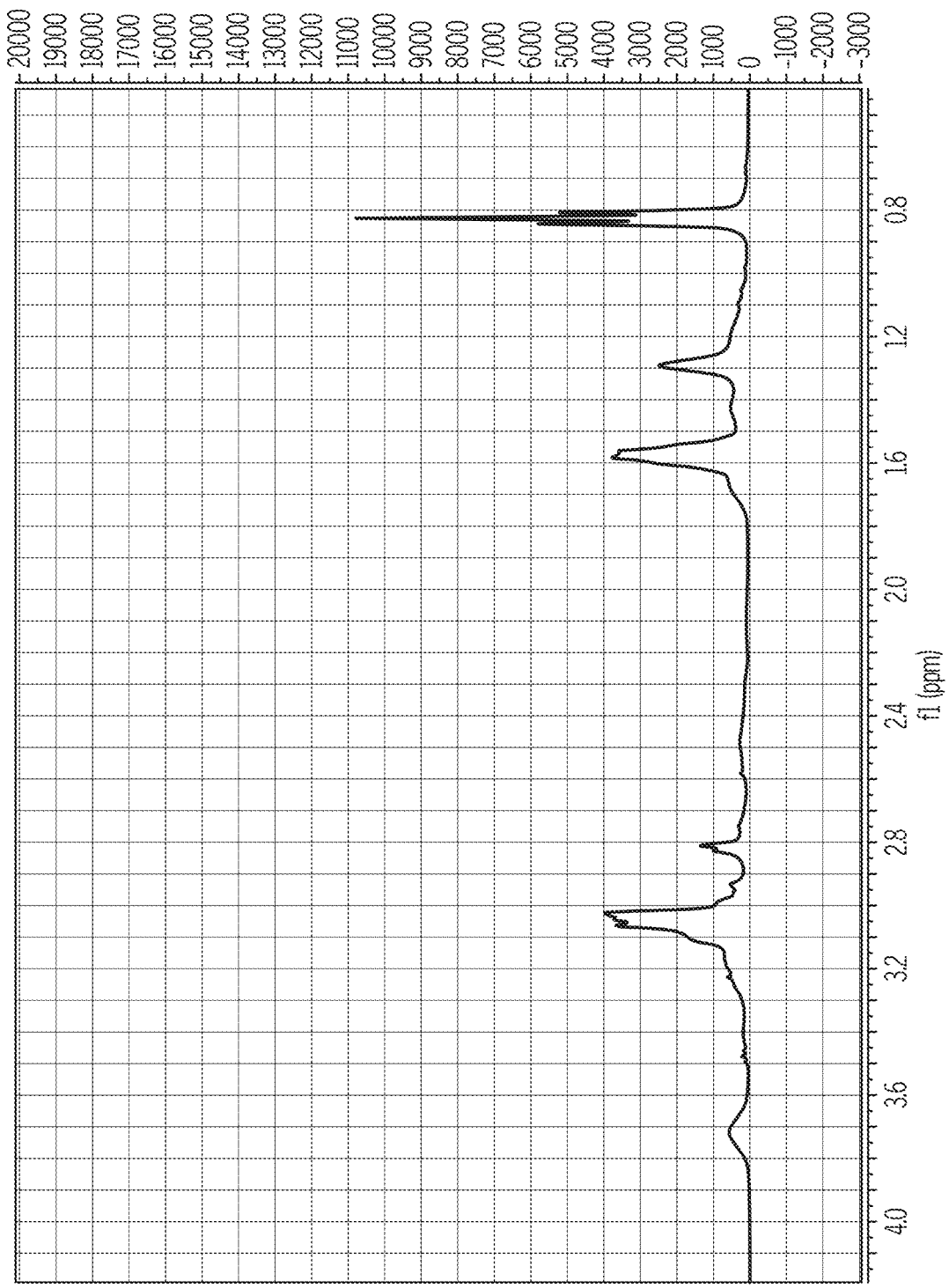
FIG. 2 depicts a Liquid Proton Nuclear Magnetic Resonance ($^1$H-NMR) spectrum of PDAMAB-TMHAB as synthesized in Example 1, according to one or more embodiments described in this disclosure.

The PDAMAB-TPHAB polymer synthesized in Example 1 was analyzed by $^1$H-MAS-NMR. The $^1$H-MAS-NMR spectrum for the polymer produced in Example 1 is depicted in FIG. 2. The $^1$H-MAS-NMR spectrum shows peaks at or near 0.85 parts per million (ppm), at or near 1.3 ppm, at or near 1.6 ppm, at or near 2.8 ppm, and at or near 3.05 ppm.

Example 2—Synthesis of Mesoporous ZSM-5 Zeolite

A mesoporous ZSM-5 zeolite was formed having a Si/Al molar ratio of 30. In a typical synthesis, a homogeneous solution was prepared by dissolving 0.75 g of NaOH and 0.21 g of NaAlO$_2$ in 59.0 g of deionized water. This was followed by the addition 2.0 g of poly(N$^1$,N$^1$-diallyl-N$^1$-methyl-N$^6$,N$^6$,N$^6$-tripropylhexane-1,6-diamonium bromide), PDAMAB-TPHAB polymer under vigorous stirring at 60° C. After stirring for 1 hour, 16.5 g of tetraethyl orthosilicate (TEOS) was added dropwise to the solution and further stirred for 12 hours at 60° C. The obtained viscous gel was subjected to hydrothermal treatment at 150° C. for 60 hours. The resulting solids were washed, filtered and dried at 110° C. for overnight. The as-synthesized solids were calcined at 550° C. for 6 hours at a heating rate of 1° C./min under static conditions. Then, an ion-exchange procedure was performed using 1.0 M NH$_4$NO$_3$ solution at 80° C. The ion-exchanging process was repeated thrice prior to calcination at 550° C. for 4 hours in air to generate the H-form of ZSM-5 zeolite.

Figure 3:
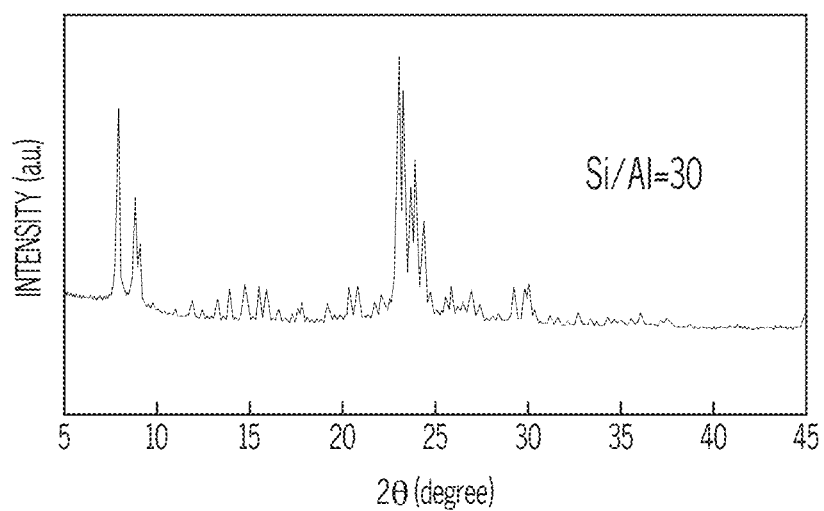
FIG. 3 depicts a Powder X-Ray Diffraction (PXRD) pattern of the mesoporous ZSM-5 zeolite of Example 2, according to one or more embodiments described in this disclosure.
Figure 4A:
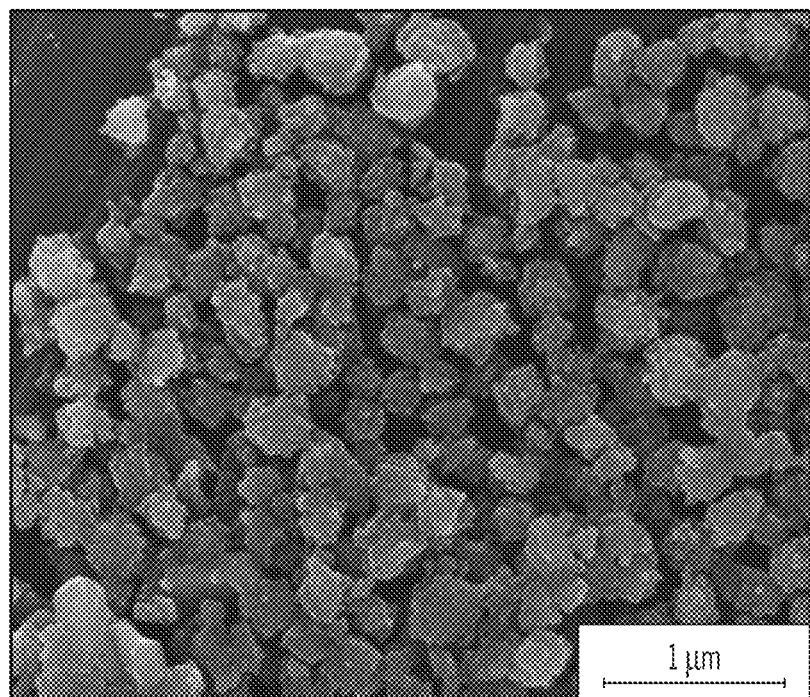
FIGS. 4A and 4B depict Scanning Electron Microscope (SEM) images of the mesoporous ZSM-5 zeolite of Example 2, according to one or more embodiments described in this disclosure.
Figure 4B:
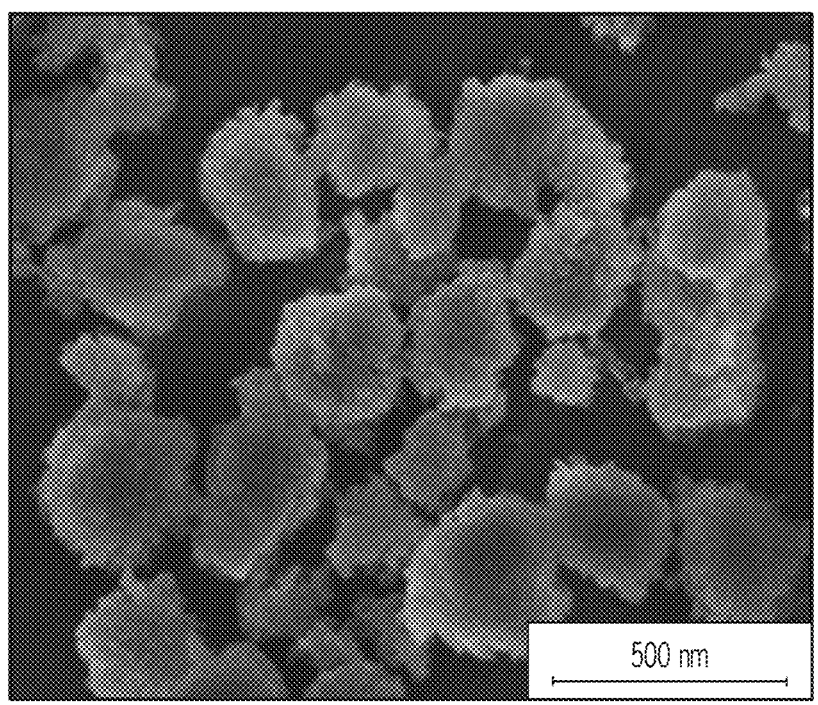
Figure 5A:
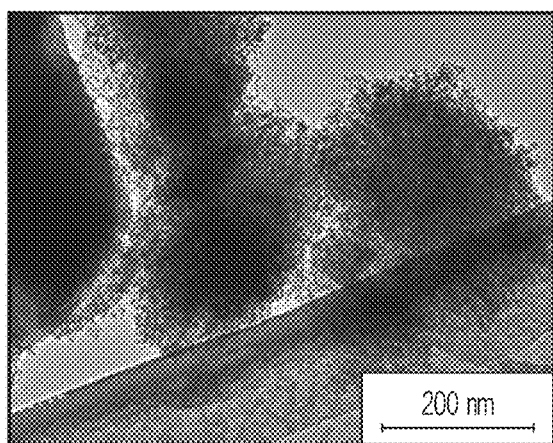
FIG. 5A-5K depict Transmission Electron Microscope (TEM) images of the mesoporous ZSM-5 zeolite of Example 2, according to one or more embodiments described in this disclosure.
Figure 5B:
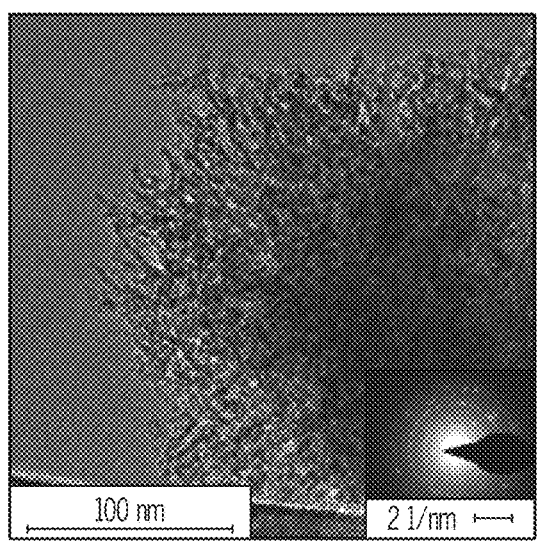
Figure 5C:
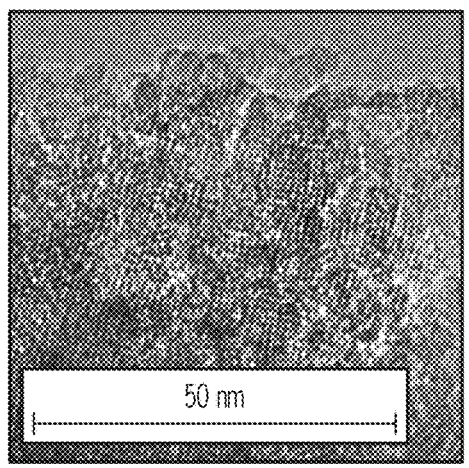
Figure 5D:
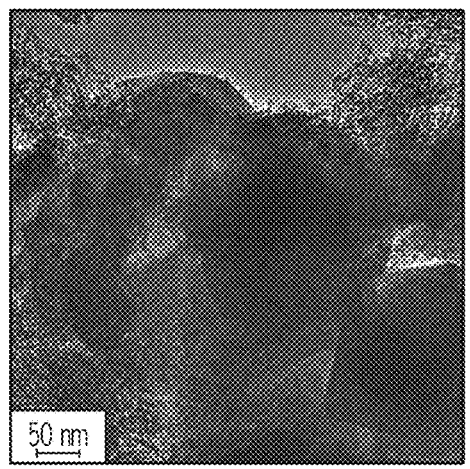
Figure 5E:
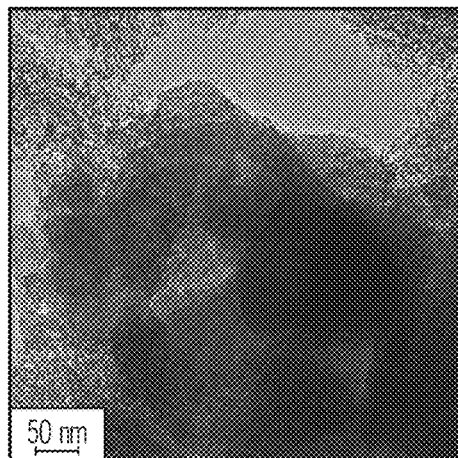
Figure 5F:
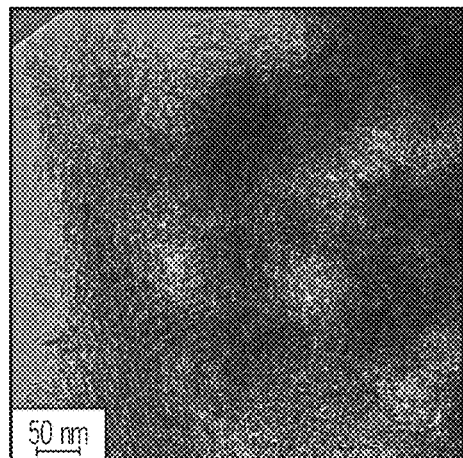
Figure 5G:
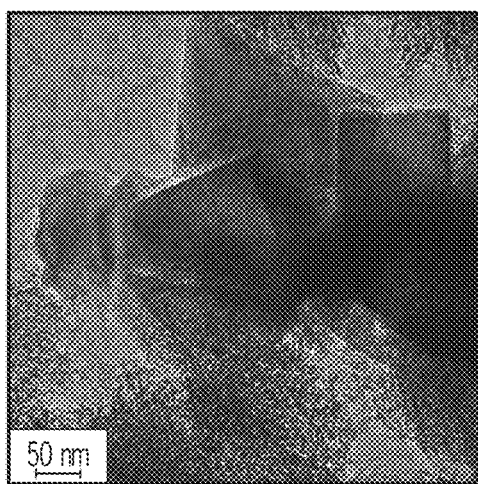
Figure 5H:
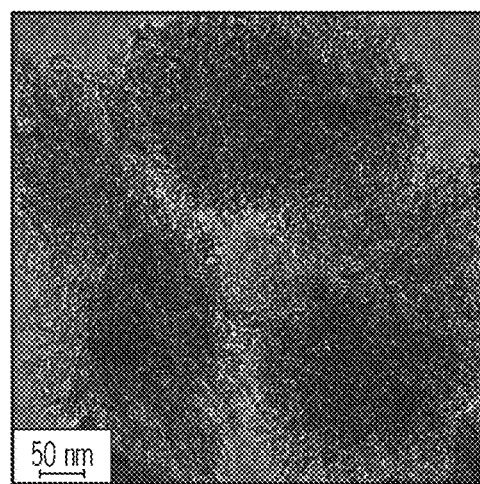
Figure 5I:
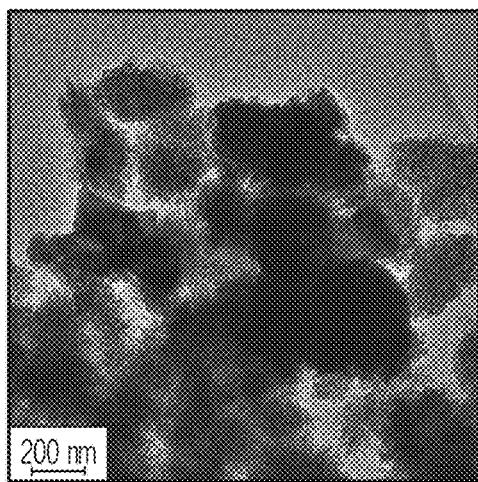
Figure 5J:
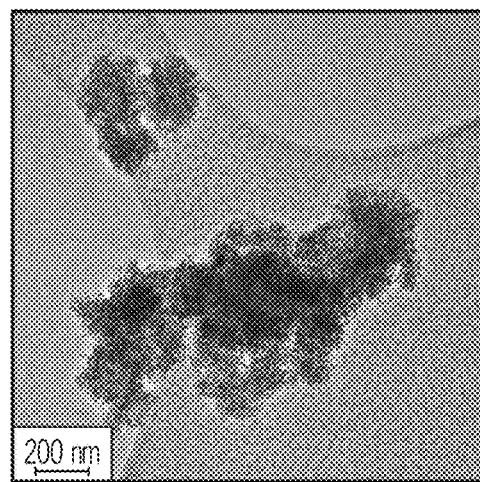
Figure 5K:
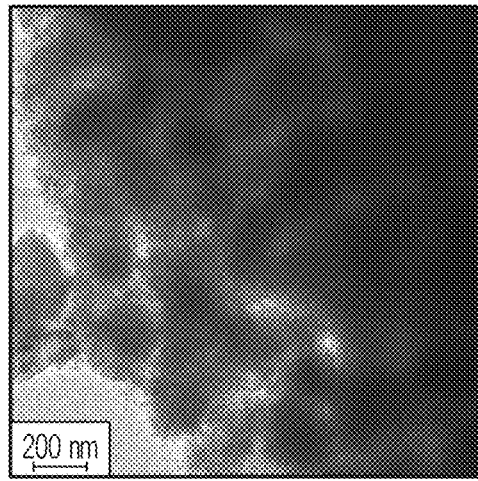

The mesoporous ZSM-5 zeolite of Example 2 was analyzed by powder X-ray diffraction (PXRD). The PXRD pattern of the mesoporous ZSM-5 zeolite of Example 2 is displayed in FIG. 3. Additionally, SEM images of the mesoporous ZSM-5 zeolite of Example 2 were obtained and are displayed in FIGS. 4A and 4B. The SEM images displayed in FIGS. 4A and 4B show that the mesoporous ZSM-5 zeolite exhibits a nanofibrous morphology with particle sizes ranging from about 200 to about 400 nm. The mesoporous ZSM-5 zeolite of Example 2 was further analyzed by TEM imaging. TEM images of the mesoporous ZSM-5 zeolite of Example 2 are displayed in FIGS. 5A-5K. These figures display uniform nanocrystals with MEI frameworks, The nanocrystals contain unidimensional nanorods that form interconnected intercrystalline open-type mesopores. The TEM images show that the lattice fringes originate from the MFI frameworks, which indicates the crystalline nature of the mesoporous. ZSM-5 zeolite of Example 2.

Example 3—Synthesis of a Dehydroxylated ZSM-5 Zeolite at 700° C.

Figure 6:
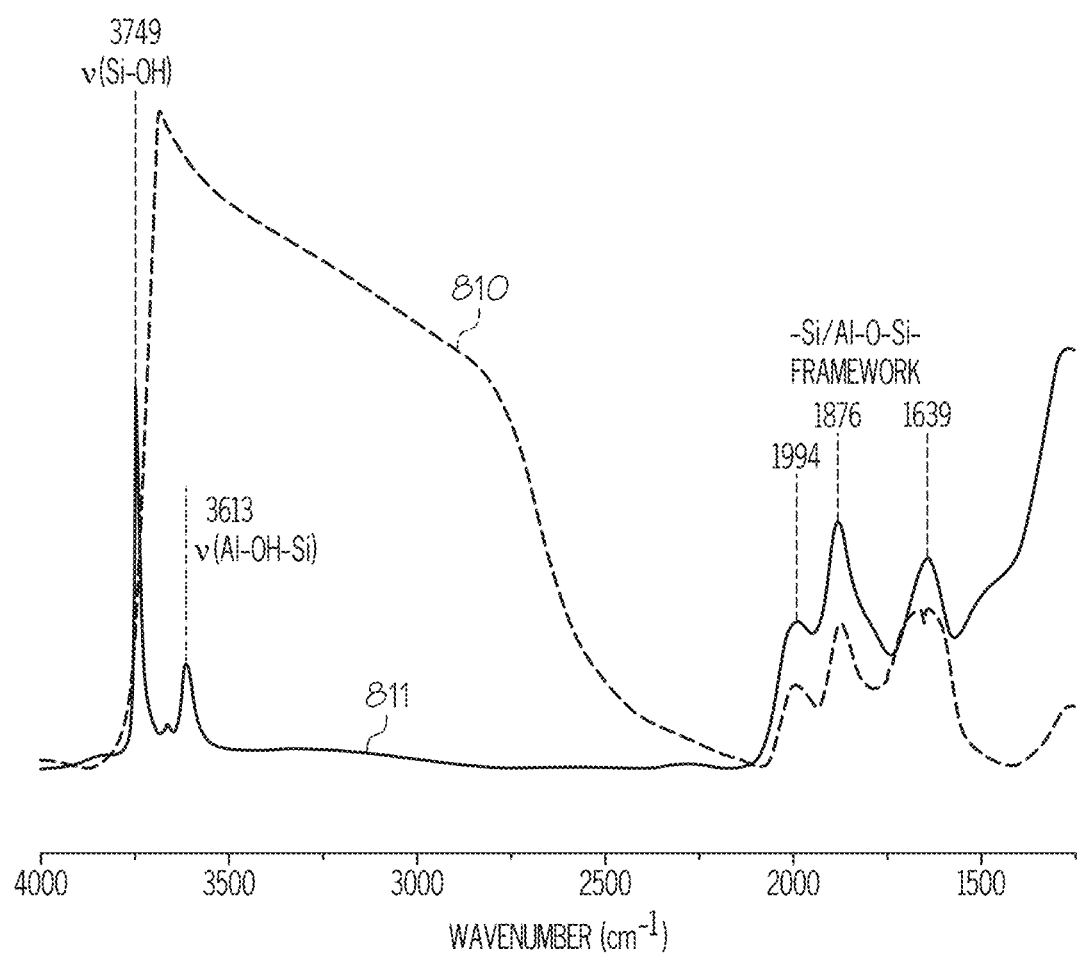
FIG. 6 depicts Fourier Transform Infrared (FT-IR) spectra of the mesoporous ZSM-5 zeolite of Example 2 and the dehydroxylated ZSM-5 zeolite of Example 3, according to one or more embodiments described in this disclosure.

A dehydroxylated ZSM-5 zeolite was formed by treating 2 g of the mesoporous ZSM-5 zeolite of Example 2 at a temperature of 700° C. and a pressure of 10$^{-5}$ mbar for a time of 20 hours. Heating occurred at a rate of 150° C./hr. The dehydroxylated ZSM-5 zeolite of Example 3 was analyzed by Fourier transform infrared (FT-IR) spectroscopy. An FT-IR spectrum comparing the mesoporous ZSM-5 zeolite of Example 2 and the dehydroxylated ZSM-5 zeolite of Example 3 is displayed in FIG. 6. Line 810 refers to the FT-IR spectrum for the mesoporous ZSM-5 zeolite of Example 2, and line 811 refers to the FT-IR spectrum of dehydroxylated ZSM-5 zeolite of Example 3. The FT-IR spectrum of the dehydroxylated ZSM-5 zeolite of Example 3 in FIG. 6 displays a peak at 3749 cm$^{-1}$ relating to isolated silanols and a peak at 3613 cm$^{-1}$ relating to a Bronsted acid. These peaks are not present on the FT-IR spectrum of the mesoporous ZSM-5 zeolite of Example 2, showing that the dehydroxylation process described in Example 3 was successful.

The dehydroxylated ZSM-5 zeolite of Example 3 was analyzed by nuclear magnetic resonance spectroscopy. A $^1$H-MAS-NMR spectrum of the dehydroxylated ZSM-5 zeolite of Example 3 is displayed in FIG. 7. The $^1$H-MAS-NMR spectrum of the dehydroxylated ZSM-5 zeolite of Example 3 displays peaks at 2.77 ppm, 2.12 ppm, and 1.93 ppm. An Aluminum Solid State Nuclear Magnetic Resonance ($^{27}$Al-SS-NMR) spectrum of the dehydroxylated ZSM-5 zeolite of Example 3 is displayed in FIG. 8. The $^{27}$Al-SS-NMR spectrum of the dehydroxylated ZSM-5 zeolite of Example 3 displays peaks at 54.69 ppm, 29.62 ppm, and 1.54 ppm.

Example 4—Synthesis of a Zirconium Modified ZSM-5 Zeolite

The dehydroxylated ZSM-5 of Example 3 was treated with the organometallic chemical tetrakis(neopentyl)zirconium by the presently described method. 0.250 g of the dehydroxylated ZSM-5 of Example 3 and 112 mg (0.3 mmol) of tetrakis(neopentyl)zirconium in 10 mL of dry and degassed n-pentane were added to a double Schlenk tube and were stirred at room temperature for 6 hours. Afterwards, the resulting solids were washed with 10 mL of dry and degassed n-pentane. This washing step was repeated twice more, resulting in a total of three washes using 10 mL of dry and degassed n-pentane each. The solids were dried under a dynamic vacuum of less than $10^{-5}$ Torr at 90° C. for 12 hours to remove the n-pentane from the resulting solids. The resulting solids were a ZSM-5 zeolite modified with the zirconium organometallic chemical tetrakis(neopentyl)zirconium, referred to herein as zirconium modified ZSM-5 zeolite.

Figure 9:
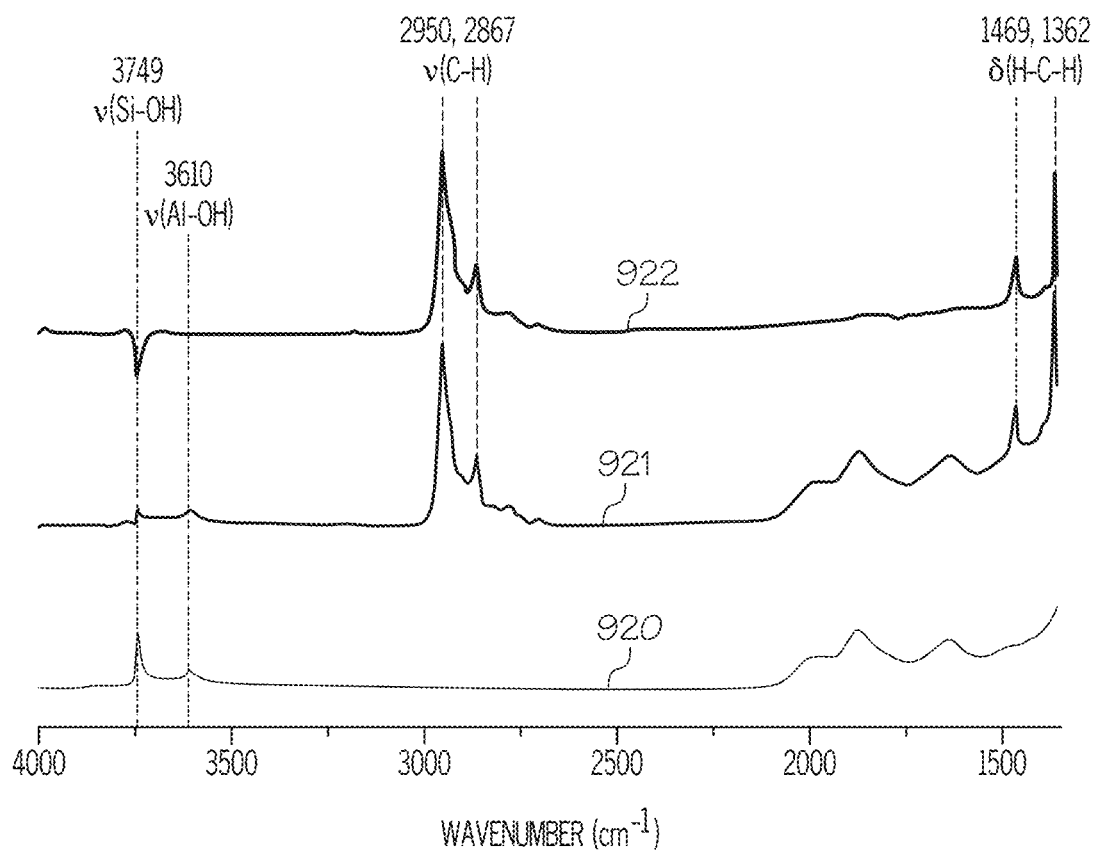
FIG. 9 depicts FT-IR spectra of the dehydroxylated ZSM-5 zeolite of Example 3 and the zirconium modified ZSM-5 zeolite of Example 4, according to one or more embodiments described in this disclosure.

The zirconium modified ZSM-5 zeolite of Example 4 was analyzed by FT-IR spectroscopy. The FT-IR spectrum of the dehydroxylated ZSM-5 zeolite of Example 3 and the FT-IR spectrum of the zirconium modified ZSM-5 zeolite of Example 4 are displayed in FIG. 9. Line 920 corresponds to the FT-IR spectrum of the dehydroxylated ZSM-5 zeolite of Example 3, line 921 corresponds to the FT-IR spectrum of the zirconium modified ZSM-5 zeolite of Example 4, and line 922 corresponds to the subtraction of the FT-IR spectrum of the dehydroxylated ZSM-5 zeolite of Example 3 from the FT-IR spectrum of the zirconium modified ZSM-5 zeolite of Example 4. A decrease in the Si—OH peak at 3749 $cm^{-1}$ is exhibited in the FT-IR spectrum of the zirconium modified ZSM-5 zeolite of Example 4. Additionally, peaks corresponding to neopentyl moieties appear at 2950 $cm^{-1}$, 2867 $cm^{-1}$, 1469 $cm^{-1}$, and 1362 $cm^{-1}$. These peaks indicate that the dehydroxylated ZSM-5 zeolite of Example 3 was successfully modified with tetrakis(neopentyl)zirconium.

Figure 10:
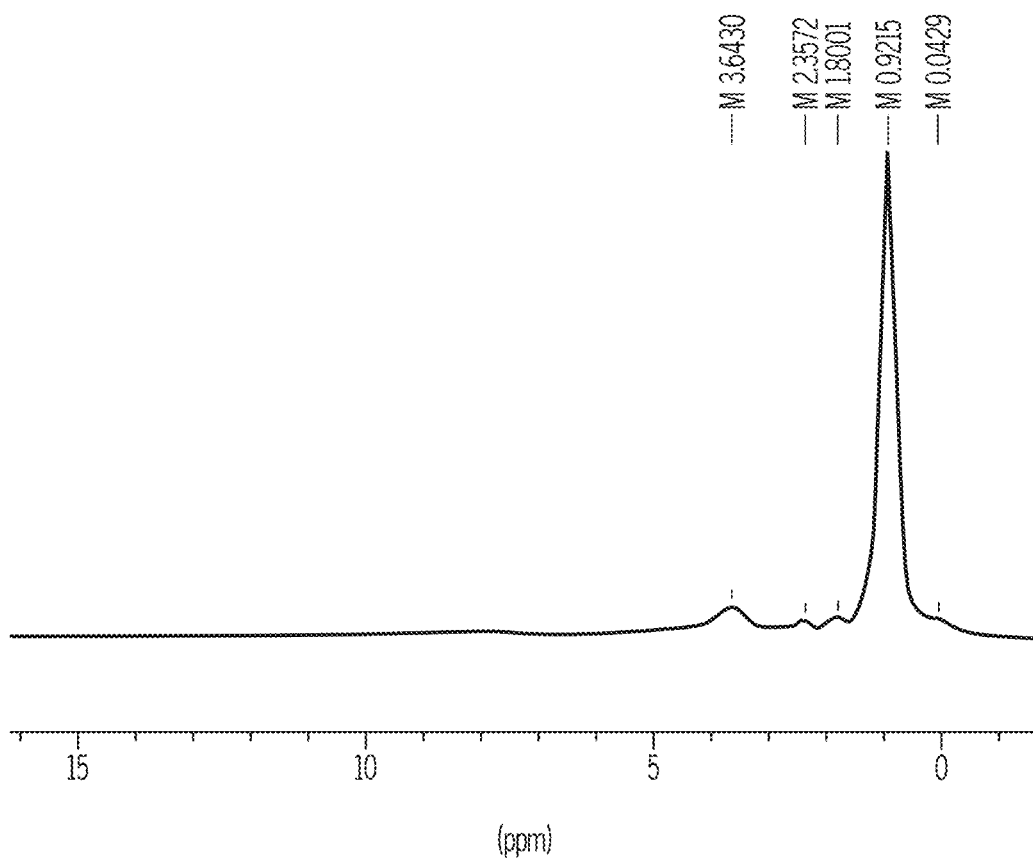
FIG. 10 depicts a $^1$H-MAS-NMR spectrum of the zirconium modified zeolite of Example 4, according to one or more embodiments described in this disclosure.

Additionally, the zirconium modified ZSM-5 zeolite was analyzed by $^1$H-MAS-NMR. The $^1$H-MAS-NMR spectrum of the zirconium modified zeolite of Example 4 is displayed in FIG. 10. Peaks corresponding to the resonance of neopentyl moieties occur at about 1.91-1.80 ppm for $CH_3$ moieties and at about 1.03-0.92 ppm for $CH_2$ moieties. This further indicates that the dehydroxylated ZSM-5 zeolite of Example 3 was successfully modified with tetrakis(neopentyl)zirconium.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

For the purposes of describing and defining the present disclosure it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue. Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

In a first aspect of the present disclosure, a modified zeolite may comprise a microporous framework comprising a plurality of micropores having diameters of less than or equal to 2 nm. The microporous framework may comprise at least silicon atoms and oxygen atoms. The modified zeolite may further comprise organometallic moieties each bonded to bridging oxygen atoms. The organometallic moieties may comprise a zirconium atom. The zirconium atom may be bonded to a bridging oxygen atom, and the bridging oxygen atom may bridge the zirconium atom of the organometallic moiety and a silicon atom of the microporous framework.

A second aspect of the present disclosure may include the first aspect where the modified zeolite may further comprise a plurality of mesopores having diameters of greater than 2 nm and less than or equal to 50 nm.

A third aspect of the present disclosure may include either of the first or second aspects where the average pore size of the modified zeolite may be greater than 2 nm.

A fourth aspect of the present disclosure may include any of the first through third aspects where the mesoporous zeolite may comprise particles of from 25 nm to 900 nm in size.

A fifth aspect of the present disclosure may include any of the first through fourth aspects where the modified zeolite may be a ZSM-5 zeolite.

A sixth aspect of the present disclosure may include any of the first through fifth aspects where the microporous framework may further comprise aluminum atoms.

A seventh aspect of the present disclosure may include any of the first through sixth aspects where the organometallic moieties may comprise $ZrR_1R_2R_3$ and $R_1$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group; $R_2$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group; and $R_3$ is chosen from be any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group.

An eighth aspect of the present disclosure may include any of the first through seventh aspects where the organometallic moieties may comprise $ZrR_1R_2R_3$, where $R_1$ is an alkyl group; $R_2$ is an alkyl group; and $R_3$ is an alkyl group.

A ninth aspect of the present disclosure may include any of the first through eighth aspects where the organometallic moieties may comprise tris(neopentyl)zirconium.

In a tenth aspect of the present disclosure, a modified zeolite may be made by a method comprising reacting an organometallic chemical with a dehydroxylated zeolite. The dehydroxylated zeolite may comprise a microporous framework including a plurality of micropores having diameters of less than or equal to 2 nm. The microporous framework may comprise at least silicon atoms and oxygen atoms. The dehydroxylated zeolite may comprise terminal isolated silanol functionalities comprising hydroxyl groups bonded to silicon atoms of the microporous framework. The reacting of the organometallic chemical with the dehydroxylated zeolite may form the modified zeolite including organometallic moieties each bonded to an oxygen atom of the modified zeolite. The organometallic moiety may comprise a portion of the organometallic chemical, and the organometallic chemical may comprise zirconium.

An eleventh aspect of the present disclosure may include the tenth aspect where the modified zeolite may comprise a plurality of mesopores having diameters of greater than 2 nm and less than or equal to 50 nm.

A twelfth aspect of the present disclosure may include either of the tenth or eleventh aspects where the average pore size of the modified zeolite may be greater than 2 nm.

A thirteenth aspect of the present disclosure may include any of the tenth through twelfth aspects where the method may further comprise dehydroxylating an initial zeolite to form the dehydroxylated zeolite, where the initial zeolite may primarily comprise vicinal silanol functionalities, and wherein dehydroxylating the initial zeolite may form the terminal isolated silanol functionalities.

A fourteenth aspect of the present disclosure may include the thirteenth aspect where at least one of dehydroxylating the initial zeolite may comprise heating the initial zeolite at a temperature of 650° C. to 1100° C. and dehydroxylating the initial zeolite may be under reduced pressure.

A fifteenth aspect of the present disclosure may include any of the tenth through fourteenth aspects where the microporous framework may further comprise aluminum atoms.

A sixteenth aspect of the present disclosure may include any of the tenth through fifteenth aspects where the average pore size of the dehydroxylated zeolite may be greater than the size of the organometallic chemical.

A seventeenth aspect of the present disclosure may include any of the tenth through sixteenth aspects where the organometallic chemical may comprise $ZrR_1R_2R_3R_4$, and $R_1$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group; $R_2$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group; $R_3$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group; and $R_4$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group or an oxo group.

An eighteenth aspect of the present disclosure may include any of the tenth through seventeenth aspects where the organometallic chemical may comprise tetrakis(neopentyl)zirconium.

A nineteenth aspect of the present disclosure may include any of the tenth through eighteenth aspects where the organometallic moieties of the modified zeolite may comprise zirconium.

A twentieth aspect of the present disclosure may include any of the tenth through nineteenth aspects where the organometallic moieties of the modified zeolite may comprise tris(neopentyl)zirconium.

The invention claimed is:

1. A modified zeolite comprising:
   a microporous framework comprising a plurality of micropores having diameters of less than or equal to 2 nm, wherein the microporous framework comprises at least silicon atoms and oxygen atoms; and
   organometallic moieties each bonded to bridging oxygen atoms, wherein the organometallic moieties comprise a zirconium atom, wherein the zirconium atom is bonded to a bridging oxygen atom, and wherein the bridging oxygen atom bridges the zirconium atom of the organometallic moiety and a silicon atom of the microporous framework.

2. The modified zeolite of claim 1, further comprising a plurality of mesopores having diameters of greater than 2 nm and less than or equal to 50 nm.

3. The modified zeolite of claim 1, wherein the average pore size of the modified zeolite is greater than 2 nm.

4. The modified zeolite of claim 1, wherein the mesoporous zeolite comprises particles of from 25 nm to 900 nm in size.

5. The modified zeolite of claim 1, wherein the modified zeolite is a ZSM-5 zeolite.

6. The modified zeolite of claim 1, wherein the microporous framework further comprises aluminum atoms.

7. The modified zeolite of claim 1, wherein the organometallic moieties comprise $ZrR_1R_2R_3$, wherein:
   $R_1$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group;
   $R_2$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group; and
   $R_3$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group.

8. The modified zeolite of claim 1, wherein the organometallic moieties comprise $ZrR_1R_2R_3$, wherein:
   $R_1$ is an alkyl group;
   $R_2$ is an alkyl group; and
   $R_3$ is an alkyl group.

9. The modified zeolite of claim 1, wherein the organometallic moieties comprise tris(neopentyl)zirconium.

10. The modified zeolite of claim 1, wherein a concentration of the organometallic moieties in the modified zeolite is at least 0.45 mmol/g.

11. A method for making a modified zeolite, the method comprising:
    reacting an organometallic chemical with a dehydroxylated zeolite, wherein the dehydroxylated zeolite comprises a microporous framework comprising a plurality of micropores having diameters of less than or equal to 2 nm, wherein the microporous framework comprises at least silicon atoms and oxygen atoms, and wherein the dehydroxylated zeolite comprises terminal isolated silanol functionalities comprising hydroxyl groups bonded to silicon atoms of the microporous framework;

wherein the reacting of the organometallic chemical with the dehydroxylated zeolite forms the modified zeolite; wherein the modified zeolite comprises the microporous framework comprising a plurality of micropores having diameters of less than or equal to 2 nm, wherein the microporous framework comprises at least silicon atoms and oxygen atoms, wherein the modified zeolite comprises organometallic moieties each bonded to bridging oxygen atoms, wherein the organometallic moieties comprise a zirconium atom, wherein the zirconium atom is bonded to a bridging oxygen atom, and wherein the bridging oxygen atom bridges the zirconium atom of the organometallic moiety and a silicon atom of the microporous framework and, wherein the organometallic moiety comprises a portion of the organometallic chemical; and wherein the organometallic chemical comprises zirconium.

12. The method of claim 11, wherein the modified zeolite comprises a plurality of mesopores having diameters of greater than 2 nm and less than or equal to 50 nm.

13. The method of claim 11, wherein the average pore size of the modified zeolite is greater than 2 nm.

14. The method of claim 11, further comprising dehydroxylating an initial zeolite to form the dehydroxylated zeolite, wherein the initial zeolite primarily comprises vicinal silanol functionalities, and wherein dehydroxylating the initial zeolite forms the terminal isolated silanol functionalities.

15. The method of claim 14, wherein one or more of:
dehydroxylating the initial zeolite comprises heating the initial zeolite at a temperature of 650° C. to 1100° C.; and
dehydroxylating the initial zeolite is under reduced pressure.

16. The method of claim 11, wherein the microporous framework further comprises aluminum atoms.

17. The method of claim 11, wherein the average pore size of the dehydroxylated zeolite is greater than the size of the organometallic chemical.

18. The method of claim 11, wherein the organometallic chemical comprises $ZrR_1R_2R_3R_4$, wherein:
$R_1$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group;

$R_2$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group;

$R_3$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group; and $R_4$ is chosen from any of an alkyl group, a hydride group, a hydroxyl group, an alkoxy group, an aryloxy group, an allyl group, a cyclopentadienyl group, an amino group, an amido group, an imido group, a nitrido group, a carbene group, a carbyne group, a halide group, a benzyl group, a phenyl group, or an oxo group.

19. The method of claim 11, wherein the organometallic chemical comprises tetrakis(neopentyl)zirconium.

20. The method of claim 11, wherein the organometallic moieties of the modified zeolite comprise tris(neopentyl)zirconium.

* * * * *